US006747718B2

United States Patent
Kanou et al.

(10) Patent No.: US 6,747,718 B2
(45) Date of Patent: Jun. 8, 2004

(54) REFLECTION-TYPE LIQUID CRYSTAL DISPLAY AND METHOD FOR MANUFACTURING THE SAME

(75) Inventors: Hiroshi Kanou, Tokyo (JP); Yuichi Yamaguchi, Tokyo (JP); Teruaki Suzuki, Tokyo (JP); Hironori Kikkawa, Tokyo (JP)

(73) Assignees: NEC Corporation, Tokyo (JP); NEC LCD Technologies, Ltd., Kanagawa (JP)

( * ) Notice: Subject to any disclaimer, the term of this patent is extended or adjusted under 35 U.S.C. 154(b) by 309 days.

(21) Appl. No.: 09/765,366

(22) Filed: Jan. 22, 2001

(65) Prior Publication Data

US 2001/0010571 A1 Aug. 2, 2001

(30) Foreign Application Priority Data

Jan. 21, 2000 (JP) ........................................ 2000-013216

(51) Int. Cl.⁷ ................................................. G02F 1/13
(52) U.S. Cl. ..................................................... 349/113
(58) Field of Search ......................................... 349/113

(56) References Cited

U.S. PATENT DOCUMENTS 5,500,750 A * 3/1996 Kanbe et al. .................. 349/42

FOREIGN PATENT DOCUMENTS

| JP | 61-6390 B2 | 2/1986 |
| JP | 61-6390 | 6/1986 |
| JP | 2-230126 A | 9/1990 |
| JP | 6-27481 A | 2/1994 |
| JP | 8-101383 A | 4/1996 |
| JP | 10-10525 A | 1/1998 |
| JP | 10-111502 A | 4/1998 |
| JP | 10-213794 A | 8/1998 |
| JP | 10-311982 A | 11/1998 |
| JP | 11-258617 A | 9/1999 |

OTHER PUBLICATIONS

T. Koizumi et al., "Reflective Multicolor LCD (II): Improvement in the Brightness", Proceedings of the SID, vol. 29/2, (1988), pp. 157–160 with Abstract.

* cited by examiner

*Primary Examiner*—James A. Dudek
(74) *Attorney, Agent, or Firm*—Sughrue Mion, PLLC

(57) ABSTRACT

A reflection-type liquid crystal display according to the invention includes two glass substrates, a transparent electrode provided on one glass substrate, an insulator film which is provided on another glass substrate and on which an uneven structure is formed, a reflecting electrode provided on the insulator film, and a liquid crystal layer sandwiched between a side of the transparent electrode and a side of the reflecting electrode. The insulator film includes a first insulating layer in which a large number of depressions isolated as surrounded by protrusions are irregularly arranged and a second insulating layer covering the insulating layer entirely. The protrusions are all connected in a network, so that if some of these protrusions have weaker adherence with an underlying layer, they can be supported by the surrounding protrusions.

12 Claims, 22 Drawing Sheets

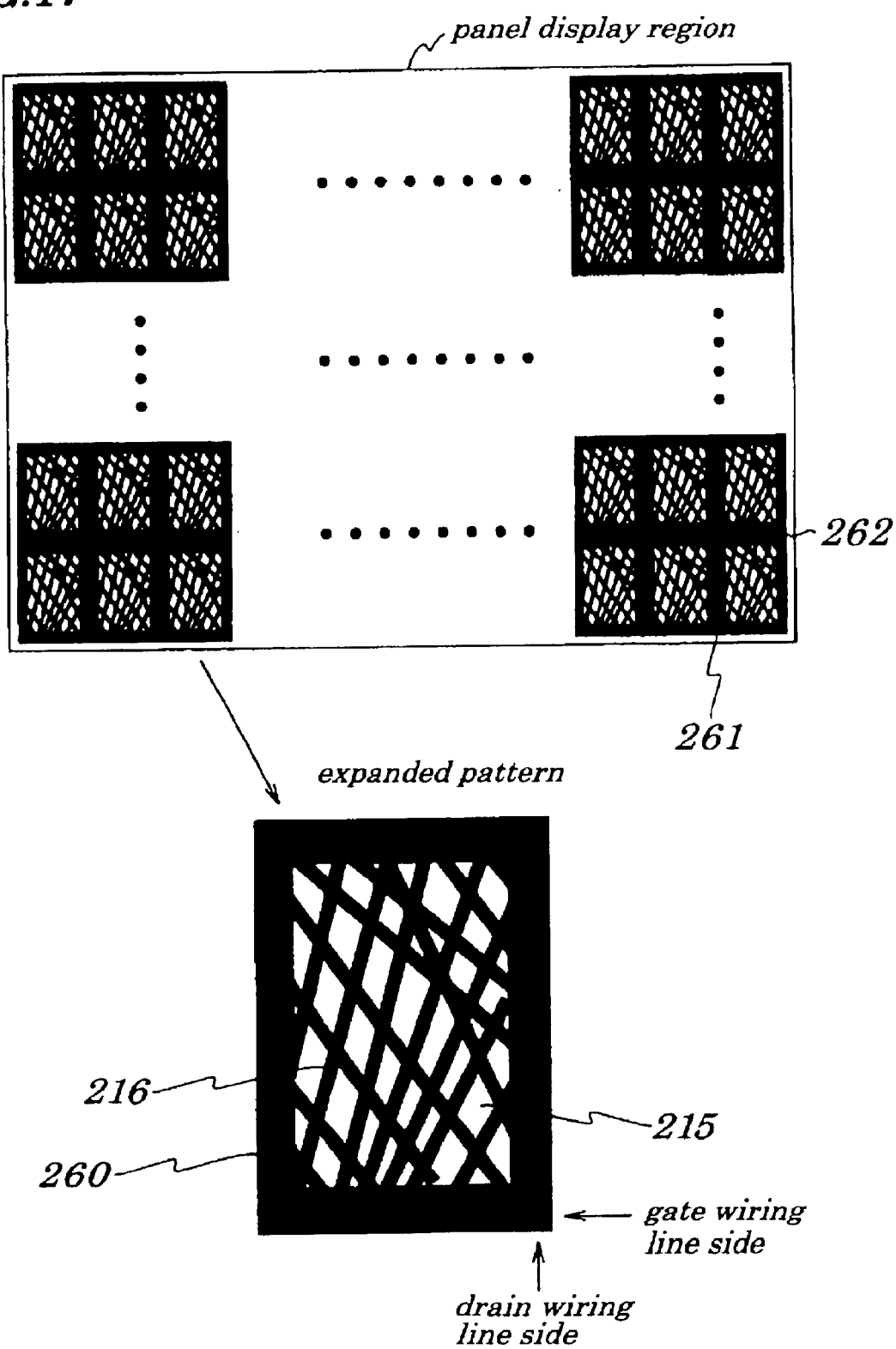

forming gate electrode forming insulator film, semiconductor film forming semiconductor film pattern forming source electrode, drain electrode forming organic insulating layer forming protrusion shape smooth protrusion shape forming insulator film forming contact region forming reflecting pixel electrode plate

REFLECTION-TYPE LIQUID CRYSTAL DISPLAY AND METHOD FOR MANUFACTURING THE SAME

The present application claims priority of Japanese Patent Application No.2000-013216 filed on Jan. 21, 2000, which is hereby incorporated by reference.

BACKGROUND OF THE INVENTION

1. Field of the Invention

The invention relates to a reflection-type liquid crystal display having a reflecting plate for reflecting out a light transmitted through a liquid crystal layer from an outside and a method for manufacturing a same.

2. Description of the Related Art

Reflection-type liquid crystal displays have been used mainly in a portable terminal because they can be made thinner, less power consuming, and lighter in weight than transmission-type ones. Specifically, a reflecting plate in the reflection-type liquid crystal display reflects an incident light transmitted from the outside, and it is therefore available as a light source for display, thus eliminating a necessity of a back-light.

A recent reflection-type liquid crystal display includes basically a liquid crystal of, for example, a TN (Twisted Nematic)-type, a single polarizing plate-type, a STN (Super Twisted Nematic)-type, a GH (guest host)-type, or a PDLC (Polymer Dispersion)-type, a Cholesteric-type, or alike, a switching element for driving the liquid crystal, and a reflecting plate provided inside or outside a liquid crystal cell. Such a typical reflection-type liquid crystal display employs an active matrix scheme which realizes high definition and high picture quality by using a TFT (TFT) or metal/insulator film/metal-structured diode (MIM) as the switching element and also has the reflecting plate attached thereto.

The following will describe a conventional liquid crystal display of the single polarizing plate-type with reference to FIG. 19.

An opposed-side substrate 1 includes a polarizing plate 2, a phase-difference plate 3, a glass substrate 4, a color filter 5, and a transparent electrode 6. A lower side substrate 7 includes, on the other hand, a glass substrate 8, a reverse stagger-structured TFT 9 formed as a switching element on the glass substrate 8, a protrusion shape 10 made up of a first insulating layer which provides an unevenly-structured base, a polyimide film 11 formed thereon as a second insulating layer, and a reflecting electrode 13 which is connected to a source electrode 12 of the TFT 9 and also which functions as a reflecting plate-and-pixel electrode.

Between the opposed-side substrate 1 and the lower side substrate 7 is located a liquid crystal layer 14.

A reflected light 16 is utilized for display. The reflected light 16 is given by an incident light 15 from outside when it passes through the polarizing plate 2, the phase-difference plate 3, the glass substrate 4, the color filter 5, the transparent electrode 6, and the liquid crystal layer 14 and then is reflected by the reflecting electrode 13.

This reflection-type liquid crystal display needs to have such display performance that it would give bright and white display when the liquid crystal is in a light-transmitting state. To achieve this display performance, the incident light 15 transmitted in various orientations needs to be efficiently emitted to the outside. To do so, an uneven structure can be formed on the polyimide film 11 to thereby provide the reflecting electrode 13 located thereon with a light-scattering function. Therefore, the display performance of the reflection-type liquid crystal display largely depends on how to control the uneven structure of the reflecting electrode 13.

The following will describe a conventional method for manufacturing a reflecting electrode used in the conventional reflection-type liquid crystal display with reference to FIG. 20A and FIG. 21J.

In steps for manufacturing a TFT, first a gate electrode 21 is formed on a glass substrate 20 (FIG. 20A). Subsequently, a gate insulator film 22, a semiconductor layer 23, and a doping layer 24 are formed (FIG. 20B). Subsequently, an island 25 of the semiconductor layer 23 and the doping layer 24 is formed (FIG. 20C), thereby forming a source electrode 26 and a drain electrode 27 (FIG. 20D). Next, a reflecting electrode 34 is formed.

In steps for manufacturing the reflecting electrode, first an organic insulator film 28 is formed which has photosensitivity (FIG. 20E). Subsequently, protrusions 29 are formed by photolithography in a region for forming the reflecting electrode (FIG. 20F) and melted into a smooth protrusion shape 30 (FIG. 21 G). Subsequently, the smooth protrusion shape 30 is covered with an organic insulator film 31 to form a further smoother uneven surface 32 (FIG. 21H). Subsequently, to electrically connect the reflecting electrode to the source electrode of the TFT, a contact portion 33 is formed (FIG. 21I), to then form a reflecting electrode 34 (FIG. 21J). This method for manufacturing reflecting electrodes is disclosed for example in Japanese Examined Patent Application No. Sho 61-6390 and in Proceedings of the SID (Tohru Koizumi and Tatsuo Uchida, Vol. 29, p. 157, 1988).

FIG. 22 is a plan view of a pattern of the protrusions 29 in the FIG. 20F. The following will describe the process with reference to FIG. 22F.

Protrusions 29 are not in contact with each other, that is mutually isolated. The protrusions 29 are each extremely small, measuring 1–20 μm in diameter and 0.5–5.0 μm in height. Therefore, during a subsequent substrate washing process, a heating process, or a film forming process, adherence between the protrusions 29 and underlying layer may deteriorate, thus causing the protrusions 29 to problematically flake off.

With this, therefore, a desired uneven structure cannot be formed in a reflecting electrode region, so that a desired optical property cannot be obtained for the reflecting electrode. That is, such the reflection electrode, if used in the reflection-type liquid crystal display, would give dark display or irregularities in brightness.

To prevent flake-off of the protrusions, also, it may be suggested that a coupling material be applied under the protrusions 29 to improve adherence. Under and below the protrusions 29, however, the TFT, the wiring lines, and a like are arranged, so that they may be adversely influenced by the coupling material, thus deteriorating reliability of the switching element. Therefore, the coupling material should not be used.

SUMMARY OF THE INVENTION

In view of the above, it is an object of the invention to provide a reflection-type liquid crystal display which prevents flake-off of protrusions which provide a base for the uneven structure of a reflecting electrode to thereby achieve high brightness and high definition display performance, and a method for manufacturing same.

According to a first aspect of the present invention, there is provided a reflection-type liquid crystal display including:

a transparent first substrate;

a transparent electrode provided on the transparent first substrate;

a second substrate;

an insulator film which is provided on the second substrate and also on a surface of which is formed an uneven structure;

a reflecting electrode which is provided on the insulator film in such a shape as reflecting the uneven structure; and a liquid crystal layer sandwiched by a side of the transparent electrode formed on the first substrate and a side of the reflecting electrode provided on the second substrate;

wherein the insulator film includes a first insulating layer in which a large number of depressions are irregularly arranged which are isolated as surrounded by protrusions and a second insulating layer which covers the first insulating layer entirely.

In the foregoing first aspect, the depressions refer to portions where there is essentially no film thickness present and so may be called apertures, through-holes or a like instead.

Protrusions on the first insulating layer according to a prior art are not in contact with each other, that is, are isolated. Therefore, if some of all the protrusions have weaker adherence with the underlying layer, they easily flake off. The protrusions on the first insulating layer according to the first aspect are all connected in a network. Therefore, even if some of those protrusions have a weaker adherence with an underlying layer, they may be supported by surrounding protrusions. With this, the protrusions can be prevented from flaking off.

In other words, the protrusions on the first insulating layer according to the first aspect are formed by an irregular arrangement of isolated depression patterns. Since the protrusions on the first insulating layer according to the prior art are formed by an irregular arrangement of isolated columnar protrusions, they easily flake off during subsequent manufacturing processes. With the first aspect the isolated depression patterns are irregularly arranged to thereby increase a contact area between the protrusions and the underlying layer, so that the protrusions do not easily flake off during subsequent manufacturing processes.

Also, those protrusions may be formed by an irregular arrangement of stripe-shaped protrusion patterns. If, in this case, the protrusions are formed by an irregular arrangement of stripe-shaped protrusion patterns, they have a larger contact area with the underlying layer than the columnar protrusion patterns according to the prior art, thus improving adherence.

Also, in the above-mentioned uneven structure, irregular uneven shapes may be repeatedly formed in an entire region of a reflecting electrode in units of one pixel (picture element) or more. With this, it is possible to suppress interference of reflecting properties, so that the reflection-type liquid crystal display employing this reflecting electrode is free of wavelength dependency without deterioration in color properties, thus providing bright and high-definition display performance.

Also, the above-mentioned protrusions may be melted into a smooth sectional shape. Next, these protrusions are covered by the second insulating layer formed subsequently, to obtain the uneven structure, so that the reflecting electrode formed thereon has good optical reflecting properties, thus permitting the reflection-type liquid crystal display having this reflecting electrode in the liquid crystal cell to give brighter display.

Also, the above-mentioned first or second insulating layer can act also as a protection film for a switching element, to prevent it from being contaminated from outside, thus achieving stable switching operations.

Also, at least one of the first and second insulating layers can cover wiring lines (at least one of drain and gate wiring lines), to reduce a parasitic capacitance due to the wiring lines and the reflecting electrode, thus suppressing occurrence of cross-talk or a like in the reflection-type liquid crystal display.

Also, at least one of the first and second insulating layers has photo-absorbancy to thus absorb an incident light from between mutual reflecting electrodes. With this, the incident light can be prevented from being applied to the switching element to thereby good switching properties, thus resulting in the reflection-type liquid crystal display having high contrast and high brightness display properties.

Also, at least one of the first and second insulating layers may have a contact hole made therein for electrically interconnecting the reflecting electrode and underlying switching element. In this case, the reflecting electrode can be provided at a top of a pixel and so can be increased in area to achieve a higher numerical aperture, thus implementing the reflection-type liquid crystal display having brighter display performance.

Also, by forming the protrusions of an organic or inorganic material having photosensitivity, patterning step for forming the protrusions can be shortened. Also, by forming the second insulating layer of an organic or inorganic material having photosensitivity, the patterning step for forming contact pattern can be shortened to thereby simplify process required, thus reducing cost for manufacturing the reflection-type liquid crystal display.

According to a second aspect of the present invention, there is provided a reflection-type liquid crystal display manufacturing method for forming an uneven structure in the reflection-type liquid crystal display according to the first aspect, the manufacturing method including steps of:

forming a first insulating layer of an organic or inorganic insulating material having photosensitivity;

forming an uneven-element pattern on the first insulating layer by photo-exposure;

etch-developing on the first insulating layer;

melting by heat treatment the first insulating layer thus etch-developed, to thereby smooth an uneven structure; and forming a second insulating layer on the first insulating layer thus melted.

With the above second aspect, it is possible to omit the resist applying, flaking, and etching steps of the resist process in patterning of the depression-protrusion portion (step), thus simplifying process and reducing costs of the reflection-type liquid crystal display. In addition, a smooth and continuous uneven structure can be manufactured, thus implementing a reflecting electrode which has a uniform and uneven surface free of protrusion flake-off.

BRIEF DESCRIPTION OF THE DRAWINGS

The above and other objects, advantages and features of the present invention will be more apparent from the following description taken in conjunction with the accompanying drawings in which:

FIG. 8H through FIG. 8L are cross-sectional views showing the method for manufacturing showing continued process steps of the reflection-type liquid crystal display according to the first embodiment of the present invention, the steps being performed in order of FIG. 8H through FIG. 8L;

FIG. 10I through FIG. 10LM are cross-sectional views showing continued steps of the reflection-type liquid crystal display according to the first example of the present invention, the steps being performed in order of FIG. 10I through FIG. 10LM;

FIG. 14H through FIG. 14KL are cross-sectional views showing continued steps of the liquid crystal display according to the second example of the present invention, the steps being performed in order of FIG. 14H through FIG. 14KL;

FIG. 16H through FIG. 16L are cross-sectional views showing continued steps of the reflection-type liquid crystal display according to the third example of the present invention, the steps being performed in order of FIG. 16H through FIG. 16L;

FIG. 17 is a plan view showing one protrusion pattern according to a fifth example;

DESCRIPTION OF THE PREFERRED EMBODIMENTS

Best modes of carrying out the present invention will be described in further detail using various embodiments with reference to the accompanying drawings.

First Embodiment

Figure 1:
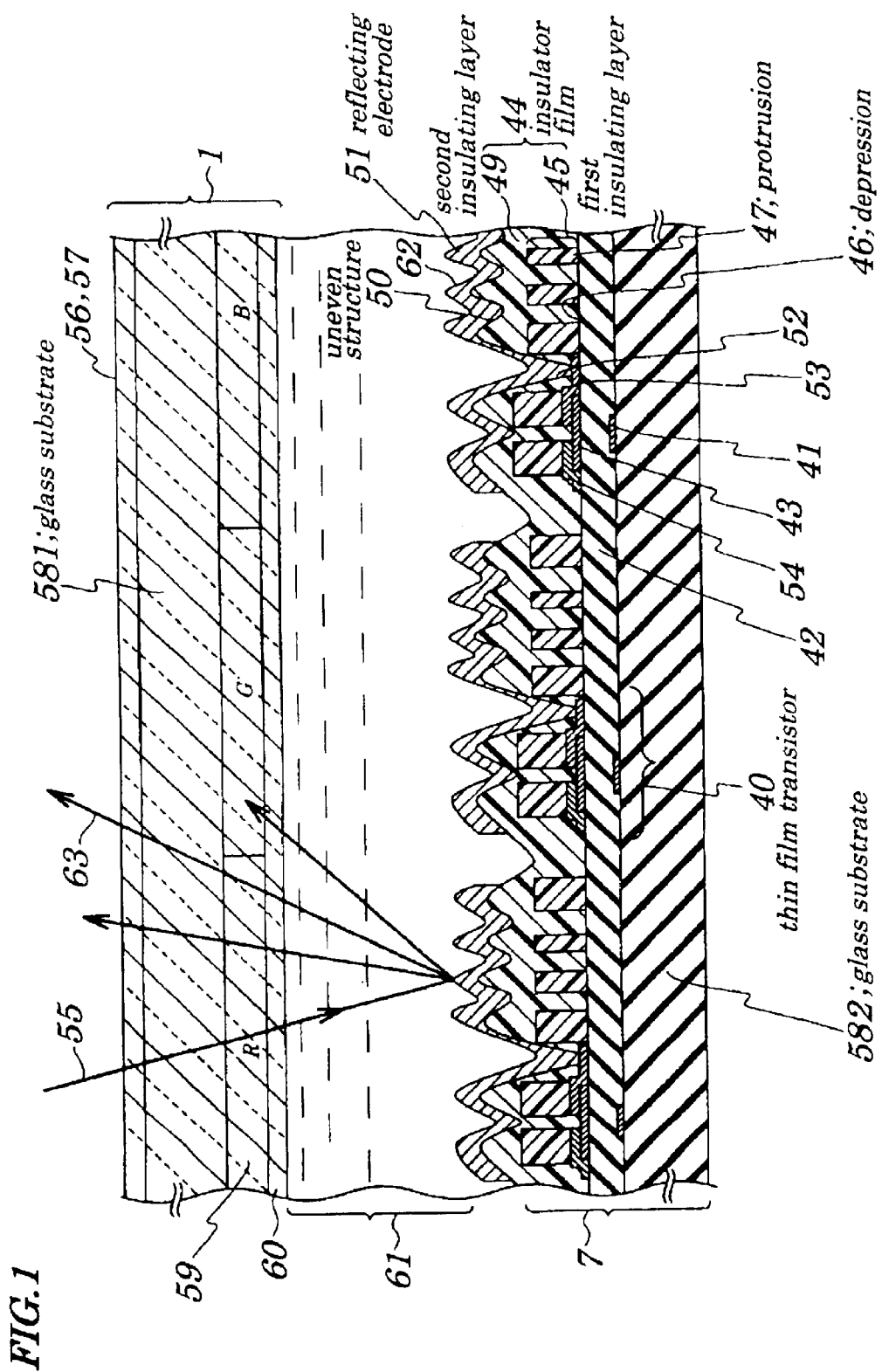
FIG. 1 is a cross-sectional view showing a reflection-type liquid crystal display according to a first embodiment of the present invention.

The following will describe a reflection-type liquid crystal display according to a first embodiment of the present invention with reference to FIG. 1.

The reflection-type liquid crystal display of the first embodiment, as shown in FIG. 1, includes a glass substrate 581 as a transparent first substrate, a transparent electrode 60 provided on the glass substrate 581, a glass substrate 582 as a second substrate, an insulator film 44 which is provided on the glass substrate 582 and on which an uneven structure 50 is formed, a reflecting electrode 51 provided on the insulator film 44 in such a shape as reflecting the uneven structure 50, and a liquid crystal layer 61 sandwiched between the transparent electrode 60 of the glass substrate 581 and the reflecting electrode 51 of the glass substrate 582. The insulator film 44 in this configuration includes a first insulating layer 45 in which a large number of depressions 46 each isolated as surrounded by a protrusion 47 are irregularly arranged and a second insulating layer 49 covering the first insulating layer 45 entirely. The protrusions 47 are as a whole connected in a network. Therefore, if some of these protrusions 47 have weaker adherence with the underlying layer, they are supported by the surrounding protrusions 47. With this, they can be prevented from flaking off.

In the first embodiment, between a mutually opposing lower side substrate 7 and an opposed-side substrate 1 is provided the liquid crystal layer 61. The lower side substrate 7 includes a reverse stagger-structured TFT 40 formed as a switching element on the glass substrate 582, an insulator film 44 having the uneven structure 50 thereon, and the reflecting electrode 51 made of high reflection efficiency metal which is formed so as to cover the insulator film 44.

The TFT 40 includes a gate electrode, a gate insulator film, a semiconductor film, a source electrode, and a drain electrode which are formed by forming a metal layer 41, an insulating layer 42, a semiconductor layer 43, or a like and then performing photolithography and etching processes thereon. Also, the TFT 40 has thereon the first insulating layer 45 made of an organic or inorganic insulating layer.

The first insulating layer 45 has thereon the isolated depressions 46 and the continuous protrusions 47. Those depressions 46 and protrusions 47 are disposed irregularly. The second insulating layer 49 covers the depressions 46 and the protrusions 47, thereby having the uneven structure formed thereon. By forming high-reflectance metal on the uneven structure 50, the reflecting electrode 51 with a high reflection efficiency is formed.

The reflecting electrode 51 has the uneven structure 50 reflected thereon, so that a configuration of an uneven-element inclination angle on a surface of the reflecting electrode 51 determines an optical property of a reflected light. Therefore, the inclination angle of the uneven structure 50 is designed so as to obtain a desired optical property of reflection. To do so, the uneven structure 50 only has to be configured by two kinds or more of values in either of its protrusion pitch, depression pitch, protrusion height, and depression depth. The reflecting electrode 51 is electrically connected via a contact hole 52 formed in the insulator film 44 to a source electrode 53 of the TFT 40, thus functioning also as an electrode for pixels.

The following will describe operations of the reflection-type liquid crystal display according to the first embodiment of the present invention.

When the liquid crystal layer 61 is in a white state, an incident light 55 from outside the opposed-side substrate 1 passes through a polarizing plate 56, a phase-difference plate 57, the glass substrate 581, a color filter 59, the transparent electrode 60, and the liquid crystal layer 61 and then is reflected according to a directivity which reflects the shape of an uneven surface 62 of the reflecting electrode 51 and again passes through the liquid crystal layer 61, the transparent electrode 60, the color filter 59, the glass substrate 581, the phase-difference plate 57, and the polarizing plate 56, thus returning back to the outside as a display light 63. When the liquid crystal layer 61 is in a black state, on an other hand, the incident light 55 from outside the opposed-side substrate 1 is reflected by the reflecting electrode 51 in a same way as in a case of the white state but then blocked by the polarizing plate 56, so that it is not emitted to the outside. With this, the display light 63 can be turned ON/OFF.

The following will describe variants of the reflection-type liquid crystal display according to the first embodiment of the present invention.

The reflecting electrode 51 can be provided at a top of a pixel by forming the contact hole 52 in at least one of the first insulating layer 45 and second insulating layer 49 for electrically interconnecting overlying reflecting electrode 51 and underlying TFT 40. Therefore, by increasing area of the reflecting electrode 51, a higher numerical aperture can be achieved, hence brighter display can be realized.

Also, the protrusions 47 may be made of an organic or inorganic material having photosensitivity. With this, a patterning step for forming the protrusions 47 can be shortened. Specifically, formation of the protrusions 47 is completed during steps of forming, exposing, and etch-developing a photosensitive resin, so that steps for resist applying, film etching, and resist removing can be omitted in contrast to a case where prior art resist processes are employed.

Further, the second insulating layer 49 may be made of an organic or inorganic material having photosensitivity. With this, patterning steps for forming a contact pattern also can be shortened as compared to the prior art resist process, thus simplifying processes required. The photosensitive resin may come in products named "OFPR800" made by Tokyo Applied Chemistry Industry Co., Ltd., "PC339" by Japan Synthetic Rubber Co., Ltd., and other acrylic resins. The photosensitive insulating material also is not limited to the ones but may be other appropriate organic or inorganic resins.

Figure 2A:
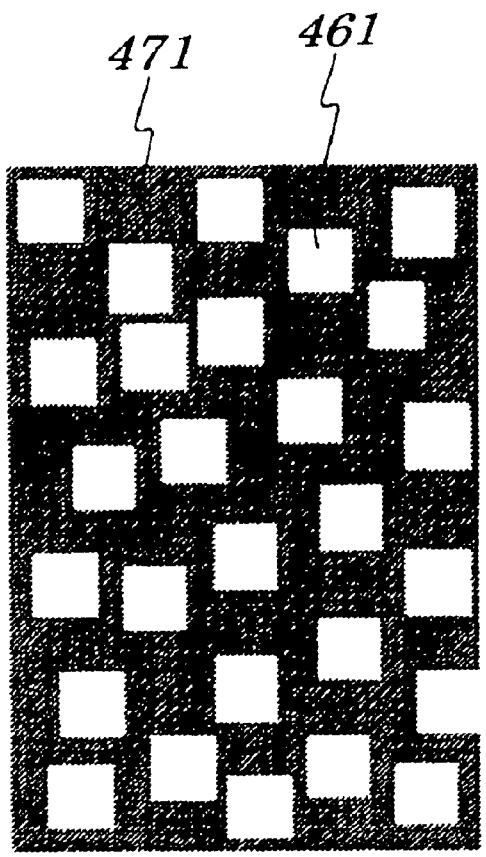
FIG. 2A and FIG. 2B are plan views showing one pixel area of a first insulating layer in the reflection-type liquid crystal display according to a first embodiment of the present invention, FIG. 2A showing a first mode of the first embodiment and FIG. 2B showing a second mode of the first embodiment.
Figure 2B:
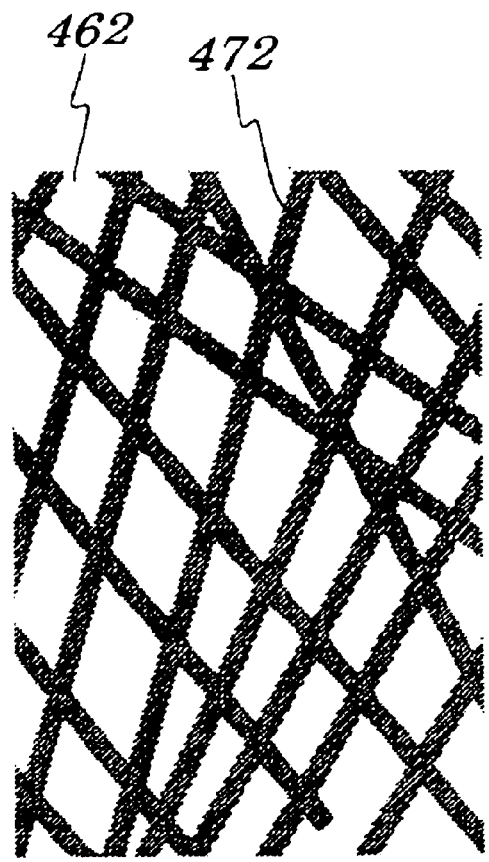

The following will describe one pixel of the first insulating layer 45 in the reflection-type liquid crystal display according to the first embodiment with reference to FIGS. 2A and 2B.

In a first mode shown in FIG. 2A, a large number of depressions 461 isolated as surrounded by the protrusions 471 are arranged irregularly. The depressions 461 are recessed in a square. In a second mode shown in FIG. 2B, a large number of depressions 462 isolated as surrounded by protrusions 472 are arranged irregularly. In this case, the depressions 462 are corresponding to portions surrounded by a large number of the stripe-shaped protrusions 472 arranged irregularly. In the first embodiment, the protrusions 471 and 472 can have a large area in contact with the underlying layer, to thereby improve adherence therewith, thus providing good protrusions that cannot easily flake off.

Second Embodiment

Figure 3A:
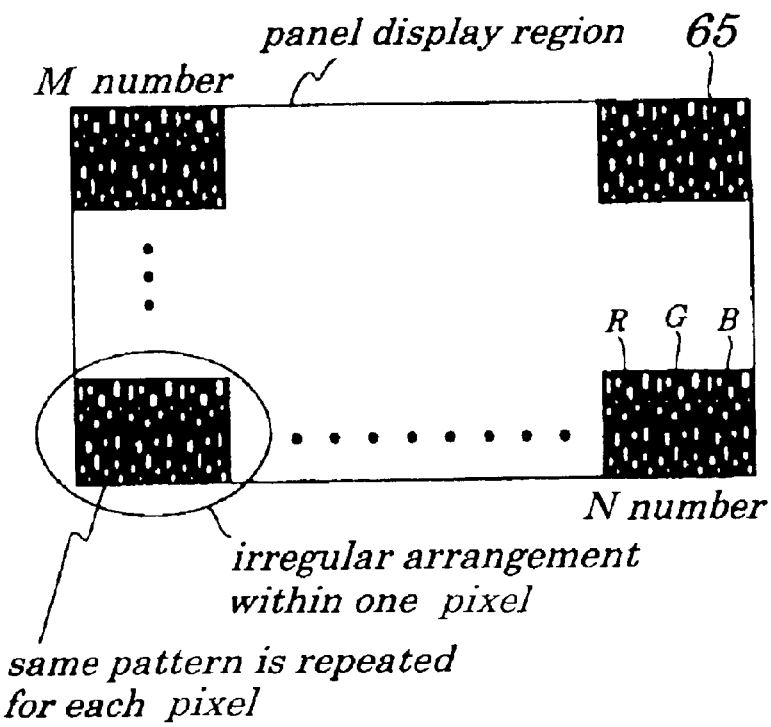
FIG. 3A and FIG. 3B are explanatory illustrations showing a reflection-type liquid crystal display according to a second embodiment of the present invention, FIG. 3A showing a first mode of the second embodiment and FIG. 3B showing a second mode of the second embodiment.
Figure 3B:
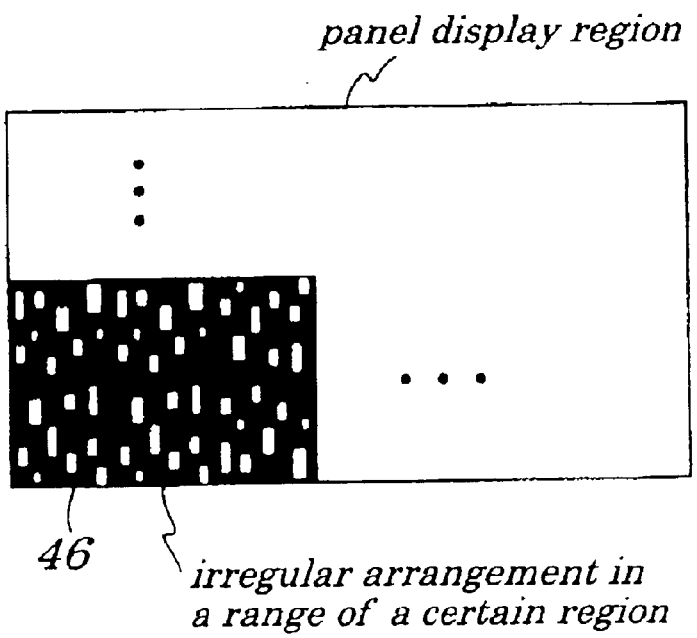

The following will describe a reflection-type liquid crystal display according to a second embodiment of the present invention with reference to FIGS. 3A and 3B.

An uneven-element pattern according to the second embodiment only has to be irregular over a region of one pixel or more in the reflection-type liquid crystal display, for example, over a region in units of three or four pixels of an RGB or RGGB type. Further, an irregular uneven-element pattern 65 may be given in a region composed of five pixels or more and repeated, to constitute uneven elements in a reflecting plate region disposed throughout on a panel display portion. In this case, it is possible to obtain almost a same bright reflecting plate as in a case where a whole surface of the reflecting plate panel is formed of irregular patterns.

FIG. 3A shows a first mode where an irregular arrangement pattern is recreated in units of one pixel in the whole surface of a display region. FIG. 3B shows a second mode where an irregular pattern is repeated in units of two pixels or more in the whole surface of the display region. A case of FIG. 3B is preferable because the irregular arrangement pattern can be repeated effectively. Although the second embodiment has been performed with an isolated depression pattern, possible patterns are not limited to it. For example, the stripe-shaped pattern mentioned in the first embodiment, or a like may be used to obtain almost same effects.

Third Embodiment

Figure 4A:
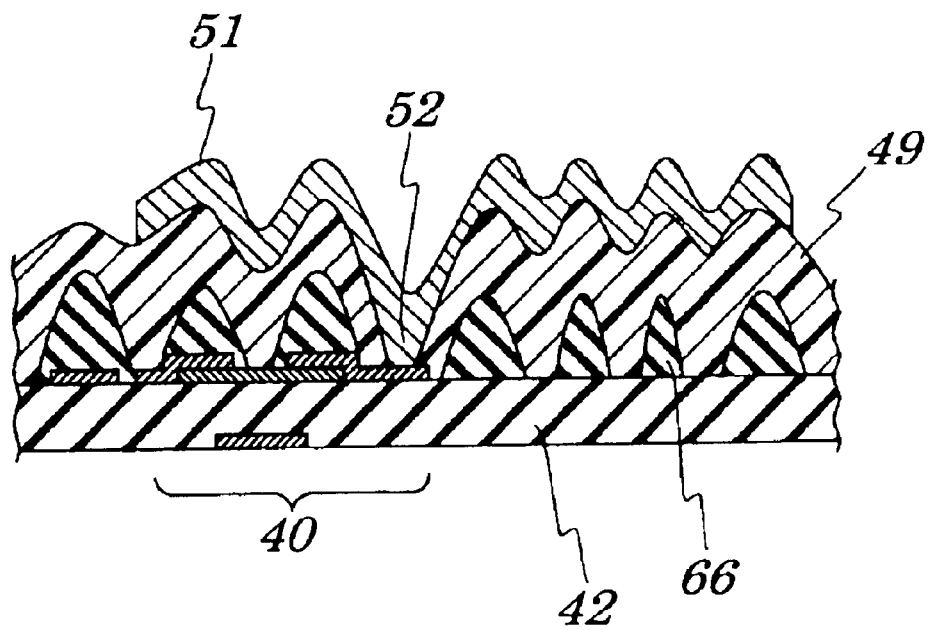
FIG. 4A is a cross-sectional view showing a reflection-type liquid crystal display according to a third embodiment of the present invention.

The following will describe a reflection-type liquid crystal display according to a third embodiment of the present invention with reference to FIG. 4A.

In the third embodiment, heat treatment is conducted after protrusions are formed, to thereby change an uneven shape, thus providing a plurality of smooth protrusion 66. With this, the uneven shape formed on a surface of a reflecting electrode 51 can be made smoother, thus giving better optical reflecting properties. Note here that a possible method for forming smooth and continuous protrusions is not limited to heat treatment described in the third embodiment but, for example, the smooth protrusions 66 may be dipped in a solution having melting or swelling properties to their material.

Fourth Embodiment

Figure 4B:
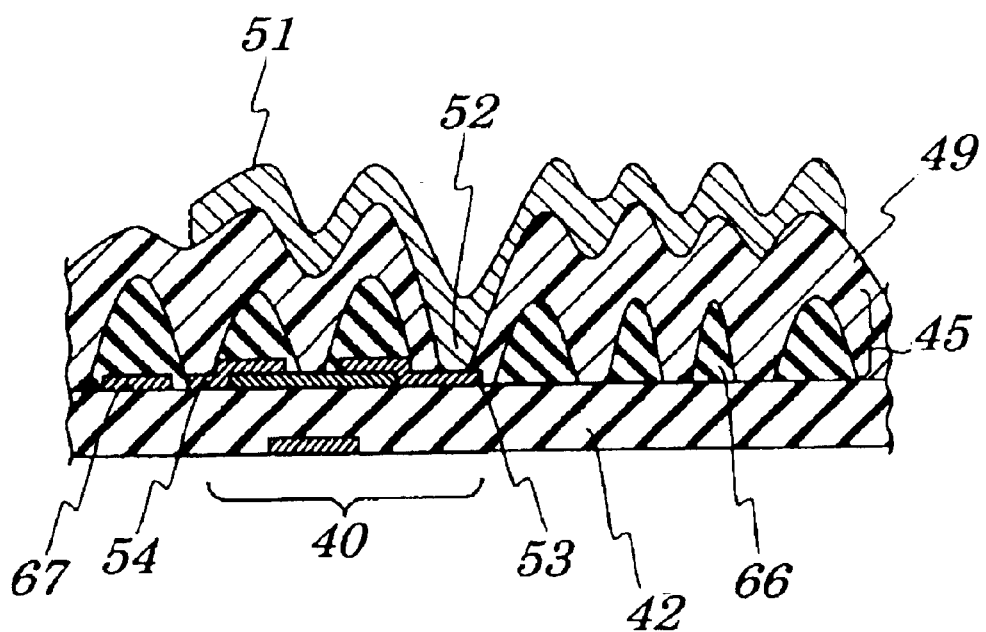
FIG. 4B is a cross-sectional view showing a reflection-type liquid crystal display according to a fourth embodiment of the present invention.

The following will describe a reflection-type liquid crystal display according to a fourth embodiment of the present invention with reference to FIG. 4B.

The first insulating layer 45 and the second insulating layer 49 are formed in such a way as to cover a TFT 40, a wiring line 67, a source electrode 53, a drain electrode 54, or a like A reflecting electrode 51, which is electrically connected via a contact hole 52 to the TFT 40, has an inter-layer separation structure by means of the second insulating layer 49. The first insulating layer 45 and second insulating layer 49 both have a function as a protection film. The first insulating layer 45 and second insulating layer 49 also are in direct contact with the TFT 40, thereby being used as a passivation film for the TFT 40. Note here that between the first insulating layer 45 and second insulating layer 49 and the TFT 40 maybe inserted a silicon nitride (SiN) or silicon oxide (SiO) film, which has been widely used as the passivation film for the TFT.

Fifth Embodiment

Figure 5A:
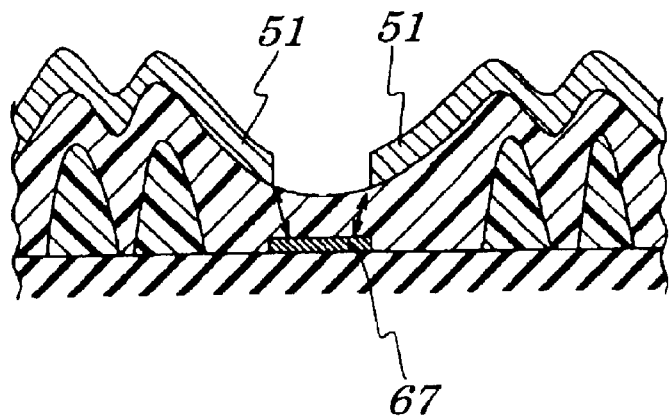
FIG. 5A through FIG. 5C are cross-sectional views showing a reflection-type liquid crystal display according to a fifth embodiment of the present invention, FIG. 5A showing a comparison example, FIG. 5B showing a first mode of the fifth embodiment, and FIG. 5C showing a second mode of the fifth embodiment.
Figure 5B:
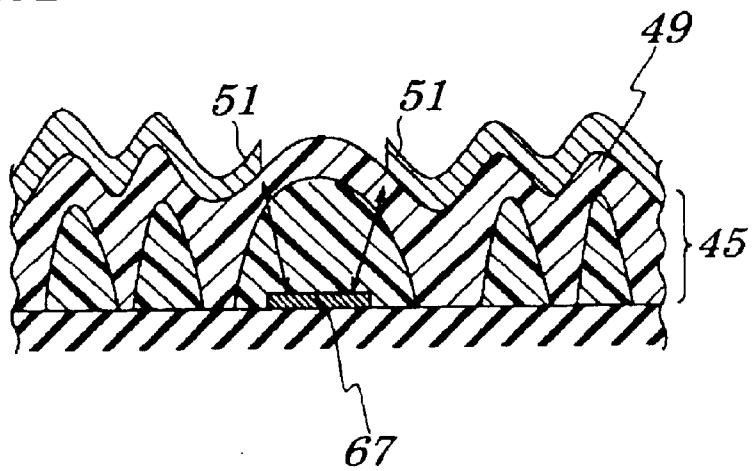
Figure 5C:
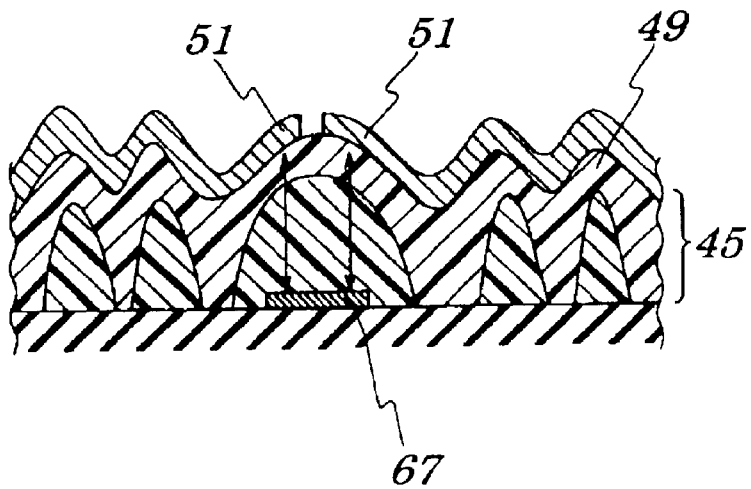

The following will describe a reflection-type liquid crystal display according to a fifth embodiment of the present invention with reference to FIG. 5A through FIG. 5C.

In a prior art structure shown in FIG. 5A, a spacing between the reflecting electrode 51 and a wiring line 67 is small, thus generating a large parasitic capacitance therebetween. In a case of the fifth embodiment shown in FIG. 5B, on an other hand, at least one of a first insulating layer 45 and a second insulating layer 49 is arranged so as to cover the wiring line 67 (at least one of a drain and gate wiring lines). That is, the first insulating layer 45 and/or second insulating layer 49 can be used as an insulator film interposed between the reflecting electrode 51 and the wiring line 67, so that this insulator film can be formed to a thickness of 1–5 μm. With this, it is possible to reduce parasitic capacitance occurring between the reflecting electrode 51 and the wiring line 67, thus suppressing occurrence of cross-talk or a like of the reflection-type liquid crystal display.

Further, as shown in FIG. 5C, the wiring line 67 and the reflecting electrode 51 can be made to overlap each other, to thereby increase area of the reflecting electrode 51 per pixel, thus realizing brighter display performance. Note here that the first insulating layer 45 and second insulating layer 49 do not always have to be arranged on the gate or drain wiring line but, for example, they may be arranged on a TFT or its electrode.

Sixth Embodiment

Figure 6:
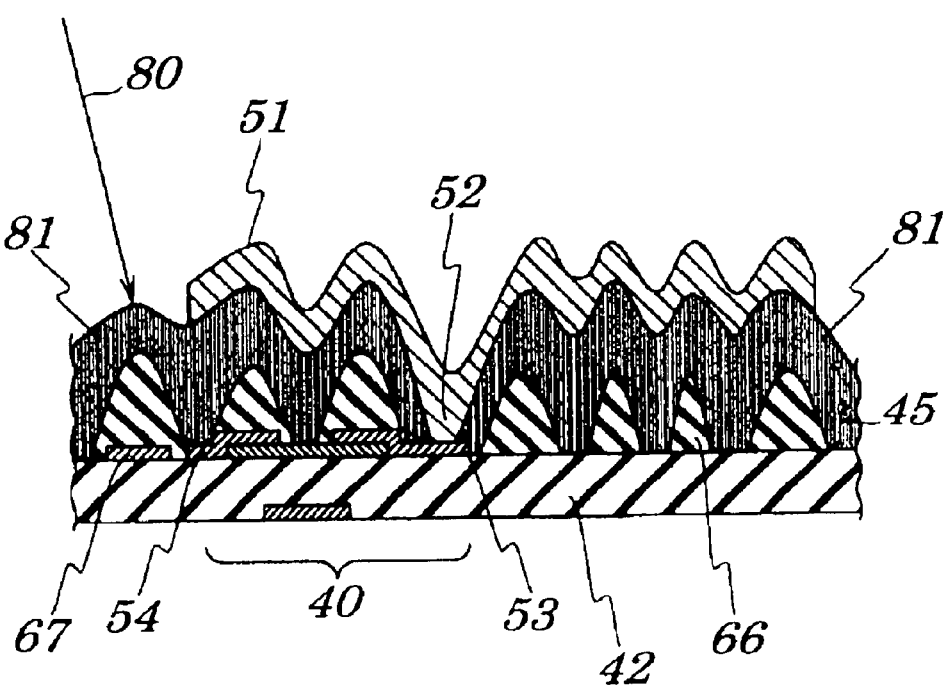
FIG. 6 is a cross-sectional view showing a reflection-type liquid crystal display according to a sixth embodiment of the present invention.

The following will describe a reflection-type liquid crystal display according to a sixth embodiment of the present invention with reference to FIG. 6.

A second insulating layer 81 may be made of an organic or inorganic resin as far as it has insulating performance and also may have transparency, coloring, and photo-absorbancy. The second insulating layer 81, particularly if it has photo-absorbancy, can completely absorb a light 80 coming through a region where there is not a reflecting electrode 51 present. With this, an incident light upon a TFT 40 can be shut out, to thereby prevent light-OFF leakage of properties of the TFT 40, thus realizing a reflection-type liquid crystal display having good switching properties.

In such a case, the second insulating layer 81 having photo-absorbancy might well be used as an insulator film which provides an uneven structure and, in order to obtain almost same effects, it only has to be arranged so as to prevent a light from being applied upon the TFT 40, so that its arrangement is not limited to a position shown in FIG. 6.

In this case, however, if a photo-absorbing layer having photosensitivity is used as a smooth uneven film formed under the reflecting electrode 51, processes can be simplified. By using, as its material, products named "Black Resist," "CFPR," "BK-748S," "BK-430S," or a like, it is possible to form a good photo-absorbing layer and a good uneven structure. Also, other appropriate black resin materials may be used to obtain almost same effects. As the photo-absorbing layer, also, a photo-absorbing or photo-reflecting film or further a metal material or a non-light-transmitting insulating material or inorganic compound film may be used.

Seventh Embodiment

The following will describe a method for manufacturing a reflection-type liquid crystal display according to a seventh embodiment of the invention with reference to FIGS. 7 and 8.

These two figures show steps for manufacturing a substrate side of a switching element. Note here that in the seventh embodiment, a reverse stagger-structured TFT is used as the switching element.

Figure 7A:
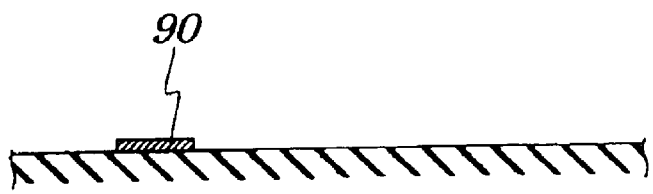
FIG. 7AB through FIG. 7G are cross-sectional views showing a method for manufacturing a reflection-type liquid crystal display according to a first embodiment of the present invention, steps being performed in order of FIG. 7AB through FIG. 7G.
Figure 7C:
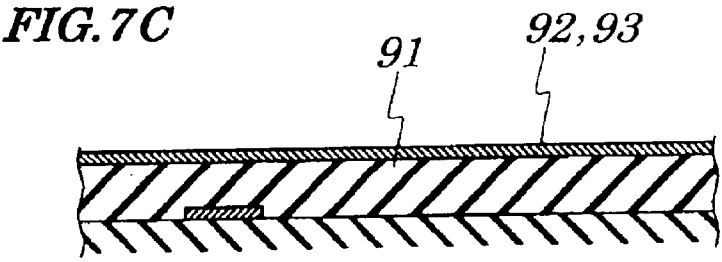
Figure 7D:
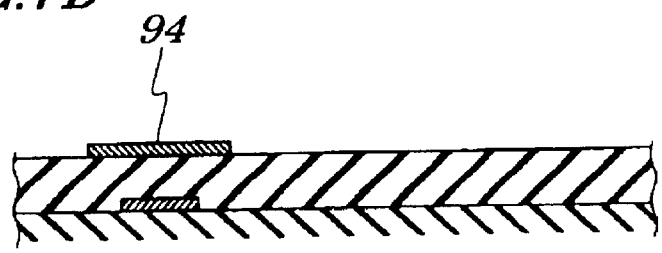
Figure 7E:
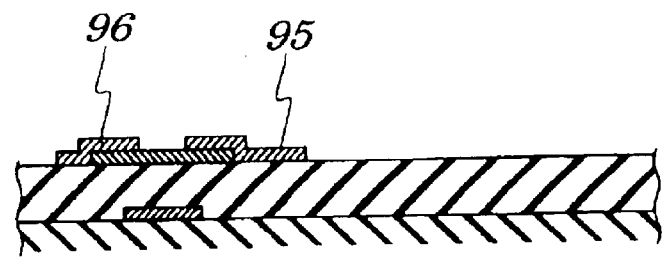
Figure 7G:
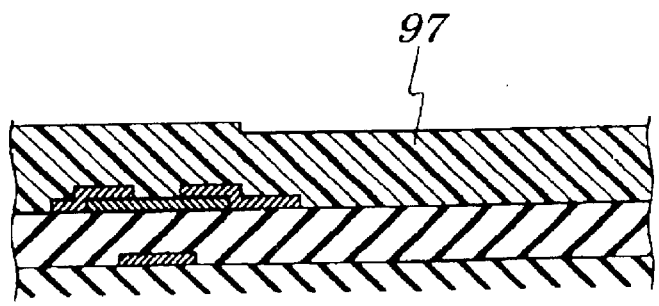
Figure 8H:
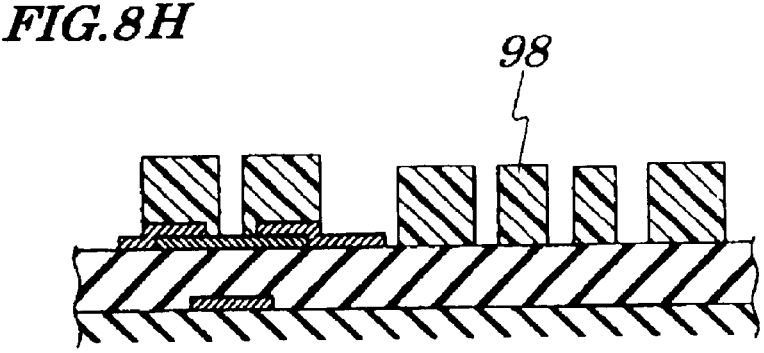
Figure 8I:
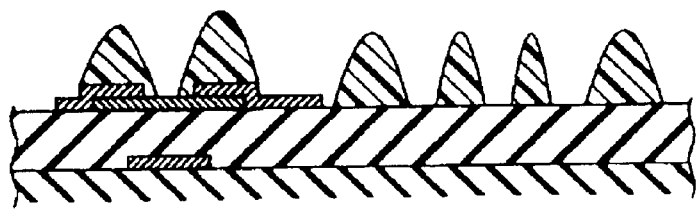
Figure 8J:
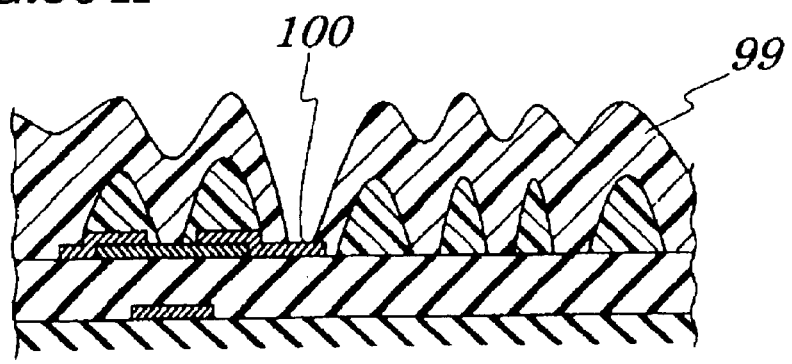
Figure 8L:
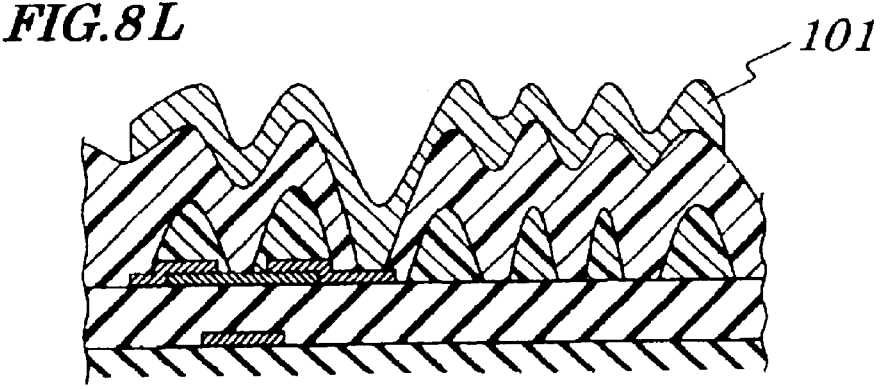

The method for manufacturing a TFT substrate according to the seventh embodiment includes steps of:

forming, as step A, an electrode material (FIG. 7AB);

forming, as step B, a gate electrode 90 (FIG. 7AB);

forming, as step C, a gate insulator film 91, a semiconductor layer 92, and a doping layer 93 (FIG. 7C);

forming, as step D, an island 94 (FIG. 7D);

forming, as step E, an electrode material (FIG. 7EF);

forming, as step F, a source electrode 95 and a drain electrode 96 (FIG. 7EF);

forming, as step G, a first insulating layer 97 (FIG. 7G);

forming, as step H, a protrusion 98 (FIG. 8H);

transforming, as processing step I, a surface shape (FIG. 8I);

forming, as step J, a second insulating layer 99 (FIG. 8JK);

forming, as step K, a contact hole 100 (FIG. 8JK); and forming, as step L, a reflecting electrode 101 (FIG. 8L).

Moreover, the step H includes processes on the first insulating layer 97 of:

(1) forming a resist;

(2) forming a resist pattern for forming uneven elements;

(3) forming a protrusion 98; and (4) removing the resist.

In this case, the step of the protrusion 98 can be controlled by film thickness of the first insulating layer 97 during the step G. Therefore, a depression-protrusion portion (step) only has to be determined on a basis of a height necessary for desired optical properties of a reflecting plate, specifically in an a range of 0.4–5.0 μm in order to obtain good photo-reflecting properties.

In a surface-shape transforming processing of the step I, a surface of the protrusion 98 after pattern formation is melted by heat treatment at 150–300° C. to be transformed into a smooth shape. Note here that besides heat treatment, this surface-shape transforming processing may employ any other processing, for example, melting processing by use of chemicals.

Also, although as the reflecting electrode 101 has been used an Al material, which is a high-efficiency metal, a silver metal or a silver alloy may be used to obtain a higher reflection efficiency, thus realizing brighter reflection performance. Also, as a switching element, a forward stagger-structured TFT, a MIM diode or a like may be used. The reverse stagger-structured TFT also is not limited to a structure employed in the seventh embodiment but may be of any other appropriate structure.

Also, although a lower side substrate having the switching element and an opposed-side substrate have been made of glass, these substrates may be made of any other appropriate materials, for example, plastic, ceramic, semiconductor, or a like

Eighth Embodiment

The following will describe a method for manufacturing a reflection-type liquid crystal display according to an eighth embodiment of the present invention.

The eighth embodiment is same as the first embodiment shown in FIG. 7AB through FIG. 8L except that a first insulating layer and a second insulating layer are made of photosensitive materials.

The eighth embodiment employs a photosensitive resin as a material of a first insulating layer 97 to thereby enable processing of patterns, in formation of protrusions 98, by direct exposure and development of the photosensitive resin, thus simplifying steps of applying and removing resists. Further, the eighth embodiment employs a photosensitive resin as a material of the second insulating layer 99 also to similarly simplify the pattern forming steps in formation of the contact hole 100. Therefore, the eighth embodiment can largely shorten manufacturing steps as compared to those of the first embodiment shown in FIG. 7AB through FIG. 8L, thus resulting in lower costs of the reflection-type liquid crystal display.

FIRST EXAMPLE

Figure 9A:
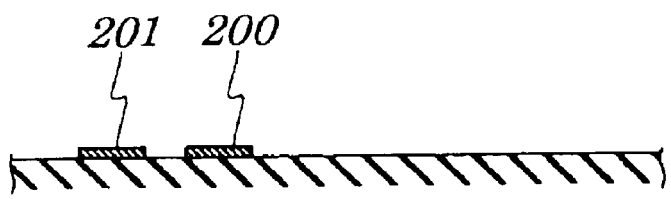
FIG. 9AB through FIG. 9H are cross-sectional views showing a reflection-type liquid crystal display according to a first example of the present invention, steps being performed in order of FIG. 9AB through FIG. 9H.
Figure 10I:
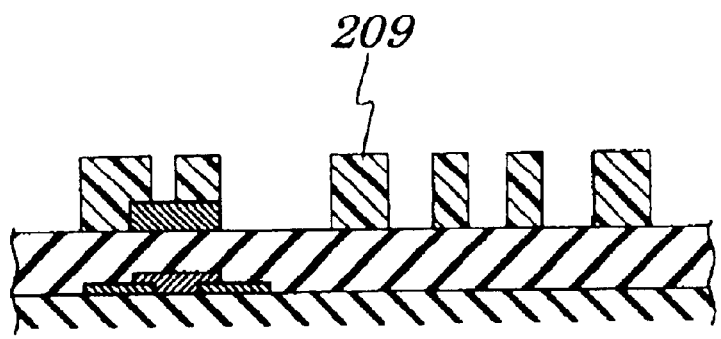
Figure 10J:
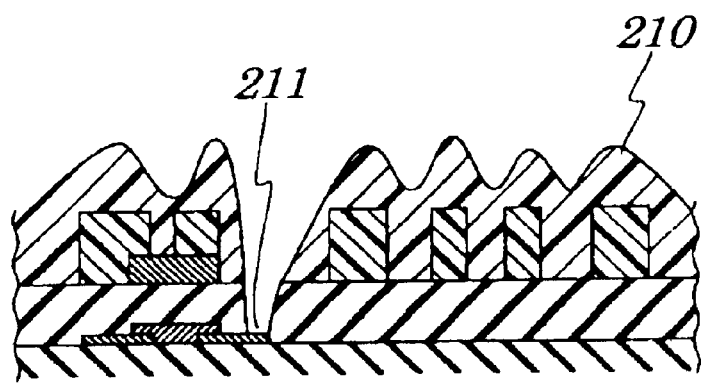
Figure 10L:
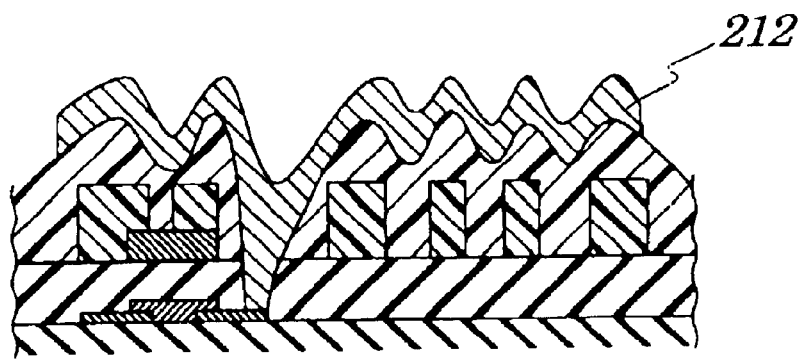

The following will describe a reflection-type liquid crystal display according to a first example of the present invention with reference to FIG. 9AB through FIG. 10LM.

Figure 9C:
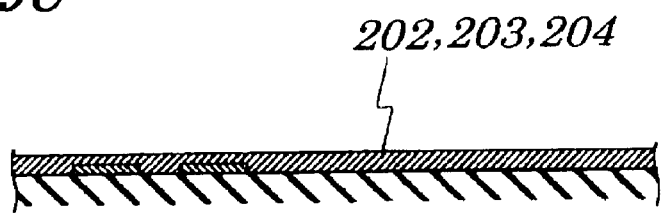
Figure 9D:
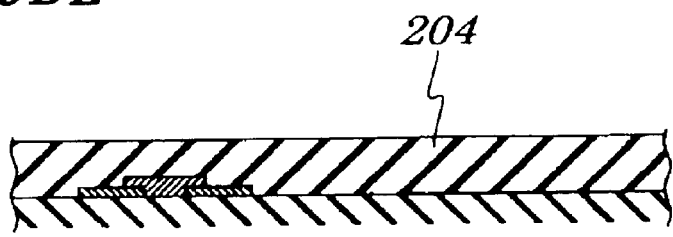
Figure 9F:
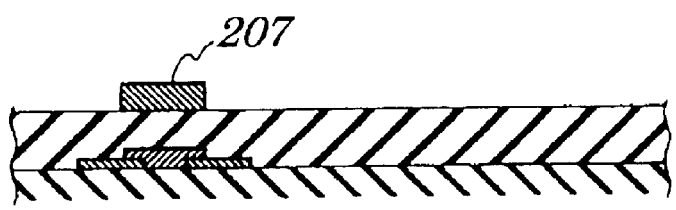
Figure 9H:
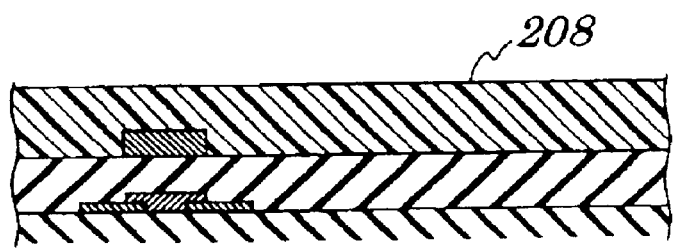

The first example employs a forward stagger-structured TFT as a switching element. A method for manufacturing the reflection-type liquid crystal display according to the first example includes steps of:

forming, as step A, Cr layer to a thickness of 50 nm on a glass substrate by sputtering (FIG. 9AB);

forming, as step B, a source electrode 200 and a drain electrode 201 (by means of a photographic process) (FIG. 9AB);

forming, as step C, a doping layer 202 to a thickness of 100 nm, a semiconductor layer 203 to a thickness of 100 nm, and a semiconductor film 204 to a thickness of 50 nm by use of plasma CVD (Chemical Vapor Deposition) respectively (FIG. 9C);

forming, as step D, an island (by means of a photographic process) (FIG. 9DE);

forming, as step E, a gate insulator film 204 to a thickness of 350 nm by plasma CVD (FIG. 9DE);

forming, as step F, a Cr layer a thickness of 50 nm by sputtering (FIG. 9FG);

forming, as step G, a gate electrode 207 (FIG. 9FG);

forming, as step H, a first organic insulator film 208 to a thickness of 3 $\mu$m (FIG. 9H);

forming, as step I, a pattern of a protrusion 209 (by means of a photographic process) (FIG. 10I);

forming, as step J, a second organic insulator film 210 to a thickness of 1 $\mu$m (FIG. 10JK);

forming, as step K, a contact hole 211 (by means of a photographic process) (FIG. 10JK);

forming, as step L, an aluminum layer to a thickness of 300 nm by sputtering (FIG. 10LM); and forming, as step M, a reflecting pixel (picture element) electrode plate, reflecting electrode 212 (by means of a photographic process) (FIG. 10LM).

In the step C, the first example uses a silicon nitride film as the gate insulator film 204, an amorphous silicon film as the semiconductor layer 203, and an N-type amorphous silicon film as the doping layer 202. Conditions for the above-mentioned plasma CVD method are set as follows. For the silicon oxide film, silane and an oxygen gas are used as a reactive gas, gas flow ratio (silane/oxygen) is about 0.1–0.5, the film forming temperature is 200–300° C., the pressure is 133 Pa, and plasma power is 200 W. For the silicon nitride film, silane and an ammonium gas are used as a reactive gas, gas flow ratio (silane/ammonium) is 0.1–0.8, the film forming temperature is 250° C., pressure is 133 Pa, and plasma power is 200 W. For the amorphous silicon film, silane and a hydrogen gas are used as a reactive gas, the gas flow ratio (silane/hydrogen) is 0.25–2.0, the film forming temperature is 200–250° C., pressure is 133 Pa, and plasma power is 50 W. For the N-type amorphous silicon film, silane and phosphine were used as the reactive gas, the gas flow ratio (silane/phosphine) is 1–2, the film forming temperature is 200–250° C., the pressure is 133 Pa, and the plasma power is 50 W.

Also, in the step D of forming the island, dry etching is conducted on the silicon nitride film and the amorphous silicon layer. In the step G of forming the gate electrode 207, the Cr layer is etched using a mixture solution of perchloric hydracid and secondary cesium-ammonium nitrate. Also, the silicon nitrate film is etched using fluorine tetrachloride and an oxygen gas as the etching gas at a reactive pressure of 0.665–39.9 Pa and a plasma power of 100–300 W. Also, the amorphous silicon layer is etched using chloride and a hydrogen gas as an etching gas at a reactive pressure of 0.665–39.9 Pa and at a plasma power of 50–200 W. Also, in every photolithography step, an ordinary resist process is employed.

Although the first example uses Cr as the source and drain electrodes and Cr metal as the gate electrode, possible electrode materials are not limited to these. Besides them, single-layer films made of Ti, W, Mo, Ta, Cu, Al, Ag, ITO (Indium Tin Oxide), ZnO, SnO, or a like or a stacked-layer film made of a combination thereof may be employed as the electrode materials.

In the first example, the uneven elements provided at the lower part of the reflecting plate are formed in the steps I and J. The following will describe a method for forming the uneven elements.

Figure 11:
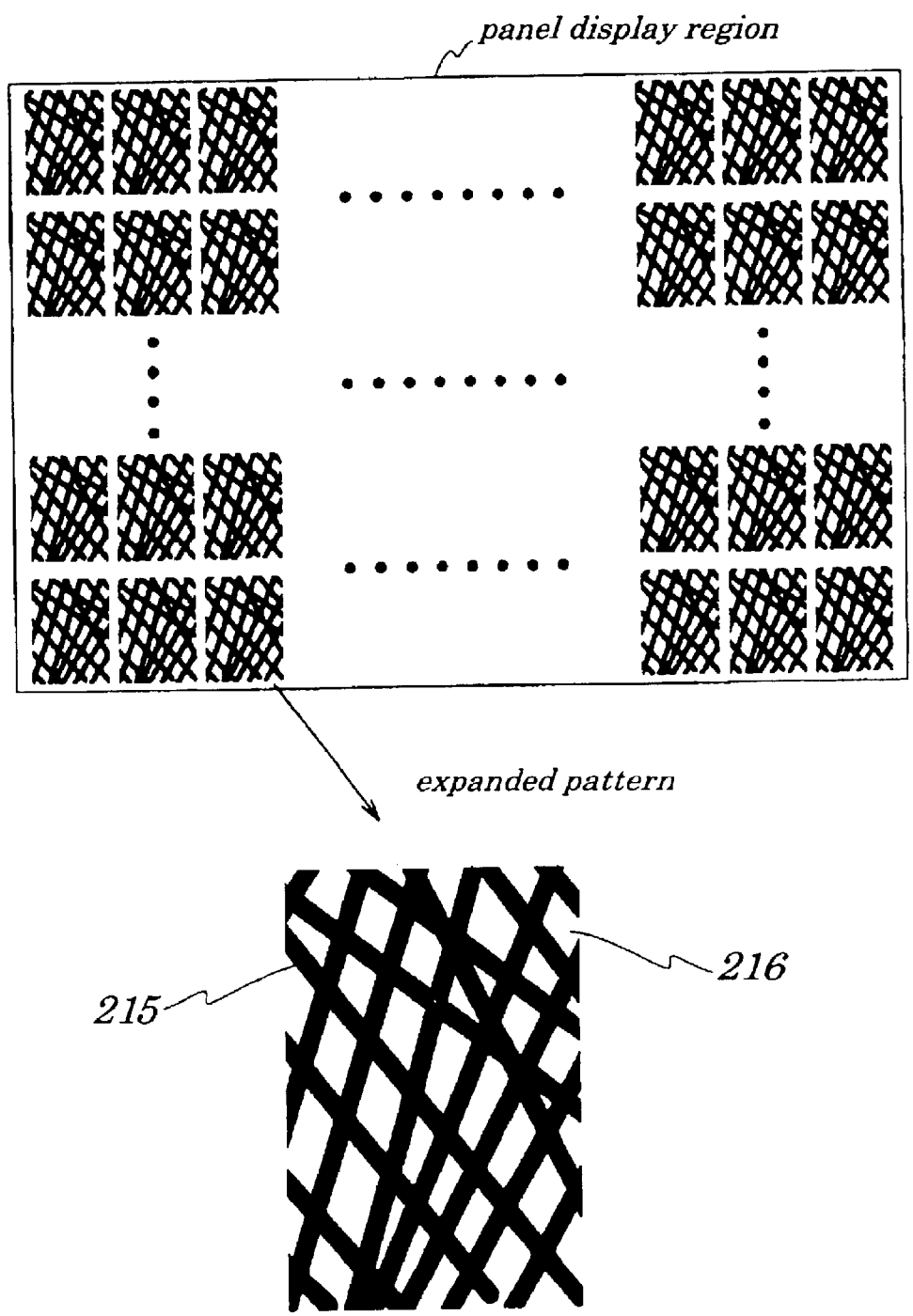
FIG. 11 is a plan view showing one protrusion pattern according to the first example of the present invention.

On the first organic insulator film 208 formed in the step H, a resist film is formed to a thickness of 2 $\mu$m, to subsequently perform exposure and development processes to form a resist pattern in which continuous stripe-shaped patterns are arranged irregularly. Then, the organic insulator film 208 is etched to remove the resist, thus forming the protrusion 209. FIG. 11 shows a panel display region pattern and its expanded figure. In FIG. 11, a continuous stripe-shaped protrusion 215 and, an isolated depression 216 are shown.

The first example employs a polyimide film (product by Nissan Chemical Industry Co., Ltd. named "RN-812") as the first organic insulator film 208 processed in the step H. Application is conducted under conditions of a spin speed of 1200 rpm, a temporary baking temperature of 90° C., a temporary baking time of 10 minutes, a main baking temperature of 250° C., and a main baking time of one hour. In the case of the resist, the conditions are a spin number of revolutions of 1000 rpm, a temporary baking temperature of 90° C., a temporary baking time of five minutes, and a post-baking temperature of 90° C. for a processing time of 30 minutes after the pattern is formed by the subsequent exposure and development. The conditions for dry etching on the polyimide film performed using the resist as a mask layer are use of fluorine tetrachloride and an oxygen gas, a gas flow ratio (fluorine tetrachloride/oxygen) of 0.5–1.5, a reactive pressure of 0.665–39.9 Pa, and a plasma power of 100–300 W. Note here that in every photolithography step, an ordinary resist process is employed.

In the step K of forming the contact hole 211, a resist process is to form the pattern. In this case, in order to form the contact hole 211, both a polyimide film which provides the second organic insulator film 210 and a silicon nitride film which provides the gate insulator film 204 are etched using a dry etching process.

Also, although a same organic resin material is used as the first organic insulator film 208 and the second organic insulator film 210, other materials may be used to form almost same uneven insulator films. The first organic insulator film 208 and second organic insulator film 210 can be realized by a combination of an inorganic resin and an organic resin or a reverse combination thereof such as an acrylic resin and a polyimide resin, a silicon nitride film and an acrylic resin, or a silicon oxide film and a polyimide resin.

Then, in the first example, an aluminum metal layer having a high reflection efficiency and fits well to the TFT process is formed and patterned into the reflecting electrode 212 as a pixel electrode-and-reflecting plate. In this case, the aluminum metal is subjected to wet etching in an etchant mixture solution of a phosphoric acid, an acetic acid, and a nitric acid heated to 60° C.

Here, a maximum depression-protrusion portion (step) on the surface of the reflecting electrode 212 is about 1 μm with the uneven-element surface shape being random. Then, the TFT substrate and the opposing substrate having a transparent electrode formed of ITO of the transparent conductive film are superposed one on the other with their respective film surfaces facing each other. In this case, the TFT substrate and the opposing substrate are oriented and bonded to each other with a spacer made of plastic particulate or a like therebetween by applying an epoxy-based adhesive agent at peripheries of the panel. Then, liquid crystal is injected to provide a liquid crystal layer, thus manufacturing the reflection-type liquid crystal display.

The reflecting electrode 212 is free of flake-off of the protrusions 209 and so is uniform and reflective having good light scattering performance. With this, the reflection-type liquid crystal display employing the reflecting electrode 212 has display performance good enough to realize a monochromatic reflection-type panel having white display brighter than a newspaper. Also, an RGB color filter is installed on the side of the opposing substrate to realize a bright multi-color reflection-type panel.

Note here that a peak-bottom difference at a step between the depression and the protrusion in the first example (height of the protrusion 209) is not limited to the above-mentioned value. This peak-bottom difference is variable in a wide range, so that an uneven structure according to the invention can be employed to provide a reflection-type liquid crystal display having largely changed directivity of reflection performance.

Figure 12:
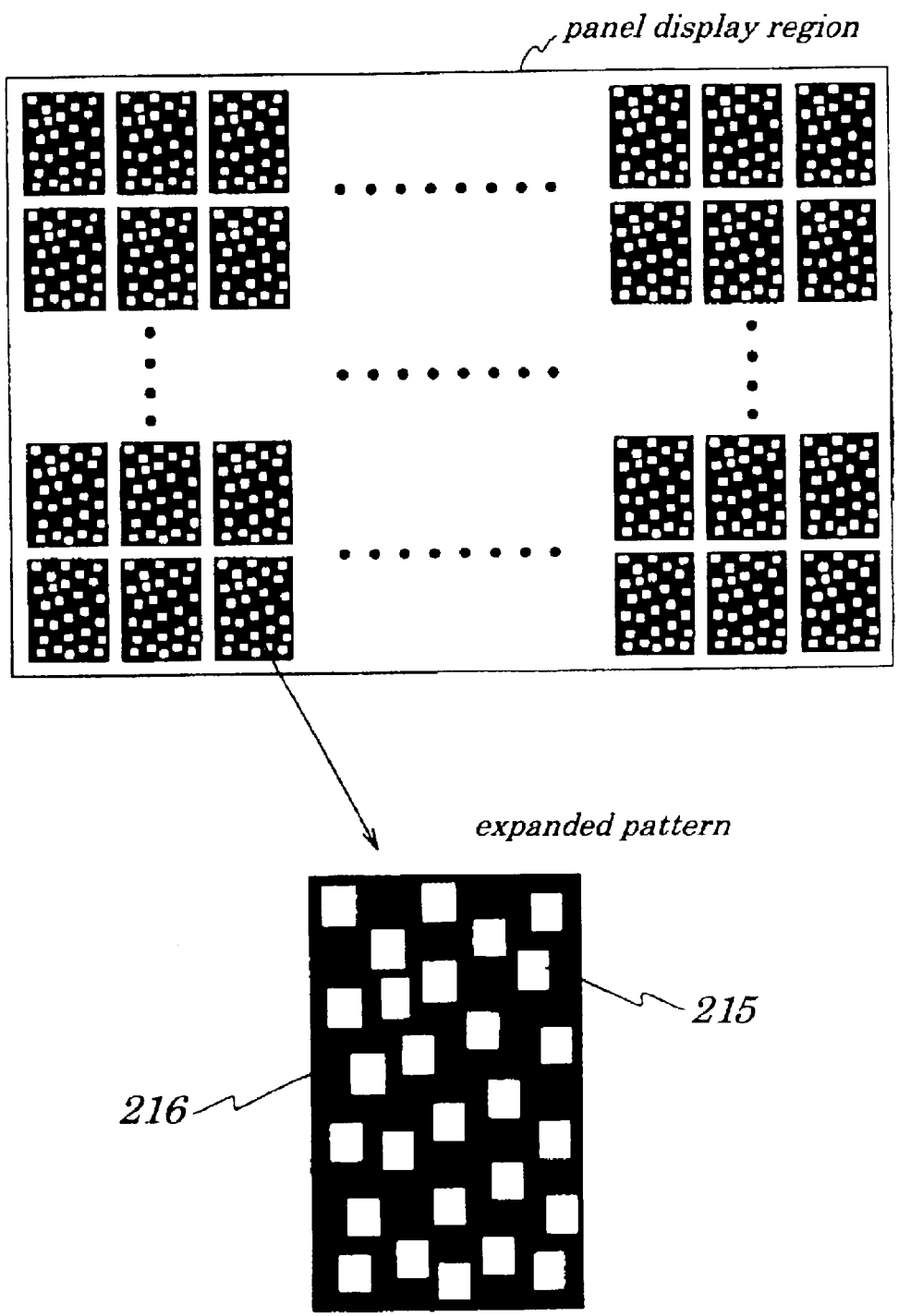
FIG. 12 is a plan view showing another protrusion pattern according to the first example of the present invention.

Although the first example employ a stripe-shaped pattern as the pattern formed in the first organic insulator film 208, a possible pattern is not limited thereto. An isolated depression pattern shown in FIG. 12 may also be used to realize a reflection-type liquid crystal display having almost same display performance.

SECOND EXAMPLE

Figure 13A:
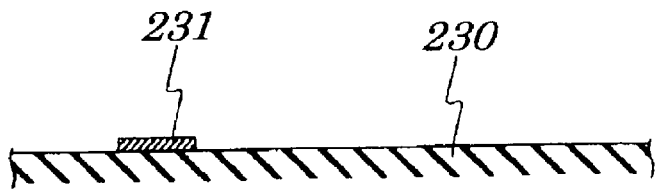
FIG. 13AB through FIG. 13G are cross-sectional views showing a the reflection-type liquid crystal display according to a second example of the present invention, steps being performed in order of FIG. 13AB through FIG. 13G.
Figure 14H:
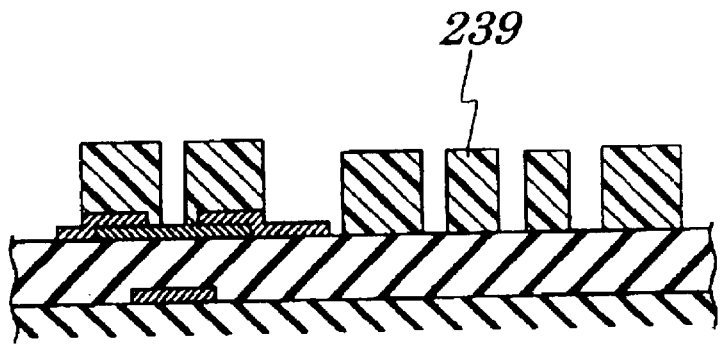
Figure 14I:
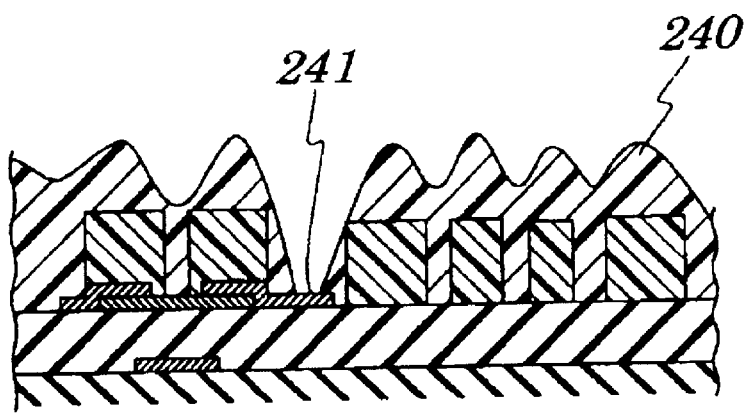
Figure 14K:
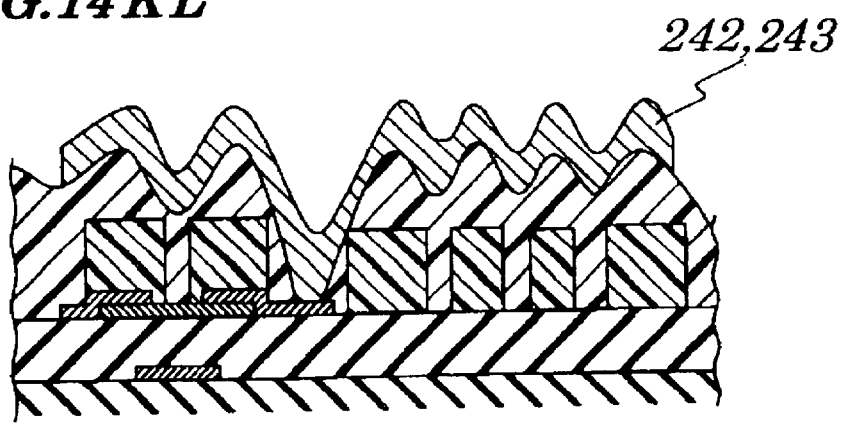

The following will describe a reflection-type liquid crystal display according to a second example of the present invention with reference to FIG. 13AB through FIG. 14KL. The second example employs a reverse stagger-structured TFT as a switching element.

Figure 13C:
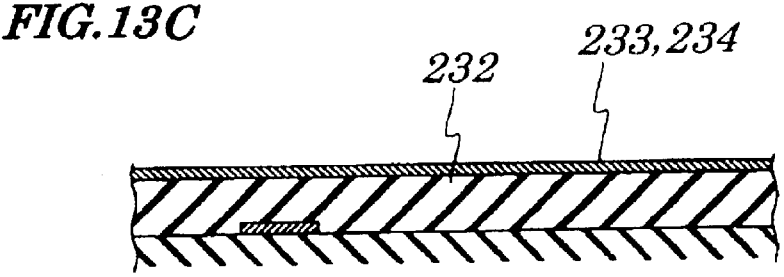
Figure 13D:
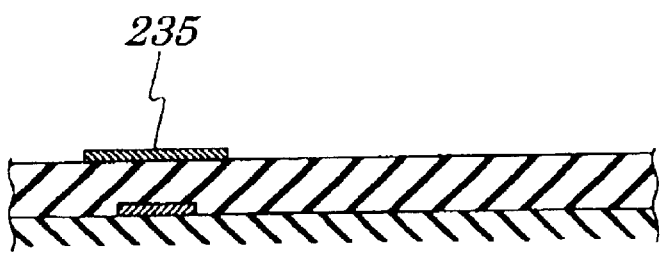
Figure 13E:
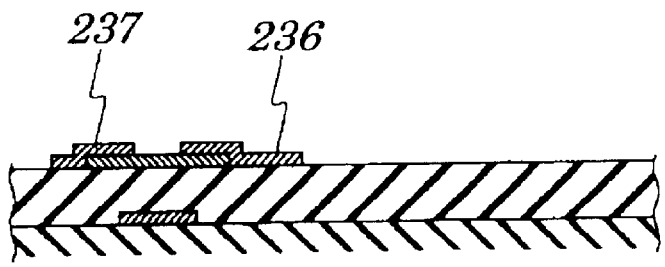
Figure 13G:
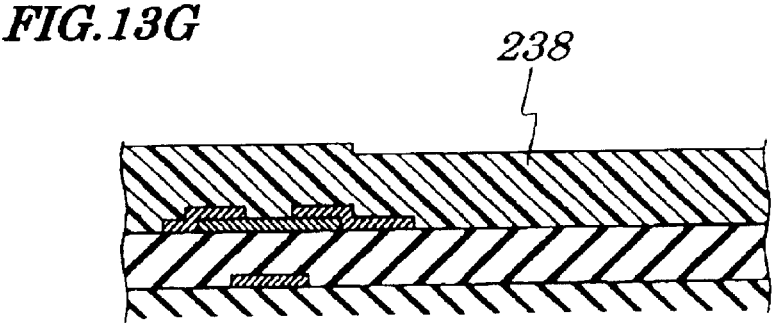

A method for manufacturing the reflection-type liquid crystal display according to the second example includes the steps of:

forming, as step A, a Cr layer to a thickness of 50 nm on a glass substrate 230 by sputtering (FIG. 13AB);

forming, step B, a gate electrode 231 (by means of a photographic process) (FIG. 13AB);

forming, as step C, a gate insulator film 232 to a thickness of 400 nm, a semiconductor layer 233 to a thickness of 100 nm, and a doping layer 234 to a thickness of 100 nm by plasma CVD respectively (FIG. 13C);

forming, as step D, an island 235 (by means of a photographic process) (FIG. 13D);

forming, as step E, Cr and ITO layers to a thickness of 50 nm respectively by sputtering (FIG. 13EF);

forming, as step F, a source electrode 236 and a drain electrode 237 (by means of a photographic process) (FIG. 13EF);

forming, as step G, a first organic insulator film 238 to a thickness of 3 μm (FIG. 13G);

forming, as step H, a protrusion 239 (by means of a photographic process) (FIG. 14H);

forming, as step I, a second organic insulator film 240 to a thickness of 1 μm (FIG. 14IJ);

forming, as step J, a contact hole 241 (by means of a photographic process) (FIG. 14IJ);

forming, as step K, an aluminum layer to a thickness of 300 nm by sputtering (FIG. 14KL);

forming, as step L, a reflecting electrode 243 (by means of a photographic process) (FIG. 14KL); and terminating, as step M, a gate wiring line (by means of a photographic process).

The protrusion 239 in the second example is formed during the step H. For this step, same conditions are employed as those for the first example. In the second example, a reverse stagger-structured transistor is employed, so that number of steps required is increased as compared to the first example.

In the second example, the reflecting electrode 243 is manufactured with its numerical aperture of 86%. Then, the TFT substrate and opposing substrate having a transparent electrode formed of ITO of a transparent conductive film are superposed one on an other so that their respective film surfaces face each other. Specifically, those TFT substrate and opposing substrate are oriented respectively and bonded to each other with a spacer made of plastic particulate or a like therebetween by applying an epoxy-based adhesive agent to peripheries of a panel. Then, liquid crystal is injected to manufacture the reflection-type liquid crystal display.

Like in a case of the first example, the reflection-type liquid crystal display according to the second example exhibited avoids process damages on a switching element to thereby obtain good element properties as well as a desired uneven reflecting-plate structure. As a result, a multi-color reflection-type panel manufactured according to the second example exhibits bright and high-definition display.

THIRD EXAMPLE

Figure 15A:
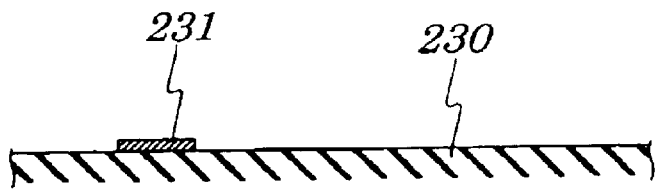
FIG. 15AB through FIG. 15G are cross-sectional views showing a reflection-type liquid crystal display according to a third example of the present invention, steps being performed in order of FIG. 15AB through FIG. 15G.
Figure 16H:
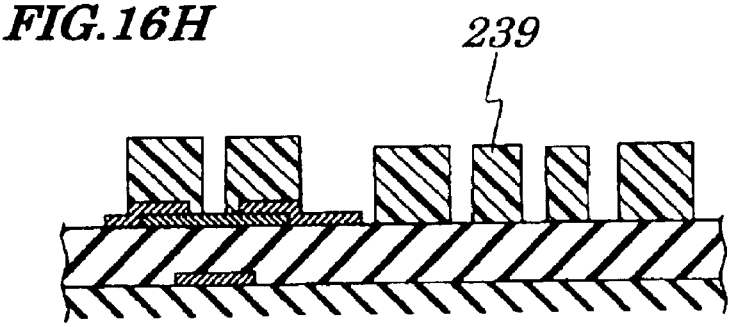
Figure 16I:
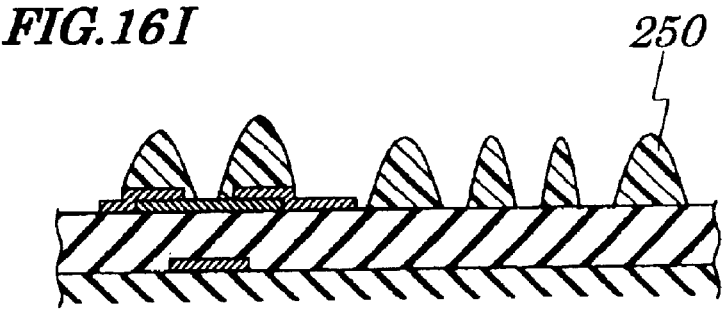
Figure 16J:
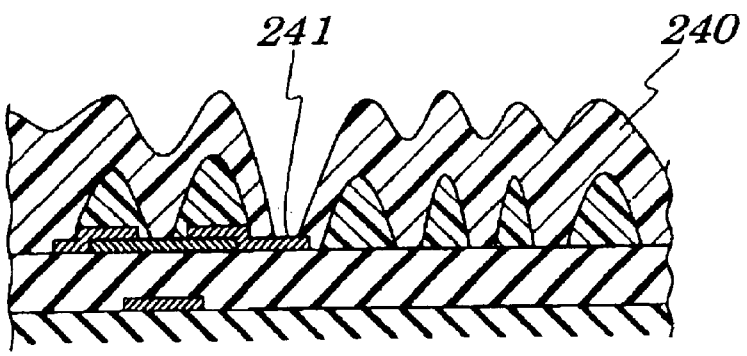
Figure 16L:
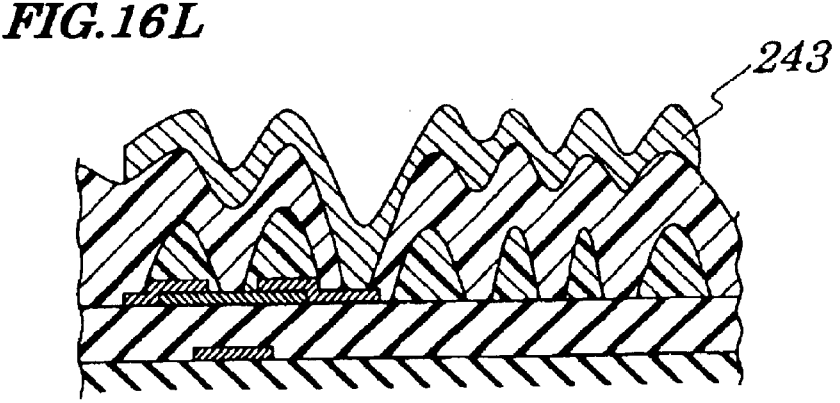

The following will describe a reflection-type liquid crystal display according to a third example of the present invention with reference to FIG. 15AB and FIG. 16L.

The first example features that a protrusion disposed under a reflecting electrode is formed in a smooth uneven shape. A manufacturing method according to the third example is same as that according to the first or the second example except that a process is added for transforming an uneven element disposed under the reflecting electrode into a smooth shape. That is, a heat treatment step is added following formation of an uneven-element pattern in a step I of the first example or a step H of the second example.

The third example performs heat treatment after formation of a uneven structure in a nitrogen atmosphere in an oven set at 260° C. for one hour. With this, a inclination angle of the uneven structure changes from a pre-heat treatment angle of about 60–80 degrees to a post-heat treatment angle of about 10–40 degrees. Thus obtained uneven shape is transformed from a rectangular shape into a sine-curved smooth protrusion 250. In the reflection-type liquid crystal display according to the third example, an average of the uneven-element inclination angle on the uneven surface is set at about eight degrees. The uneven-element inclination angle can be controlled by changing baking temperature in the heat treatment.

Also, a top-bottom difference of the uneven structure finally formed on a surface of the reflecting electrode is set at 1 μm like in cases of the first and the second examples. If this uneven-structure top-bottom difference is increased further, resultant optical properties of the reflecting electrode exhibit a very strong light-scattering performance. This scheme can be applied to a reflection-type liquid crystal display having a particularly large-sized screen to thereby reduce view-field dependency of panel display brightness, thus obtaining easy-to-see display. If this uneven-structure top-bottom difference is decreased, on the other hand, optical properties of the reflecting electrode exhibit strong directivity. This scheme can be applied to a reflection-type liquid crystal display for use in portable information equipment having a relatively small-sized screen, thus obtaining brighter display. In such a manner, the uneven surface structure can be arbitrarily controlled according to applications or panel display area.

In the third example, an insulator film is disposed between an overlying reflecting electrode and an underlying switching element, thus functioning as a protection film for that switching element.

FOURTH EXAMPLE

The fourth example features that an organic insulator film having photosensitivity is used as an insulating layer disposed under an reflecting electrode. Processes for manufacturing a reflection-type liquid crystal display according to the fourth example are same as those according to the first or second example except that a photosensitive resin (photosensitive acrylic resin in the fourth example) is used as the insulating layer under the reflecting electrode. That is, the fourth example differs from them in that a photosensitive film is used as the insulating layer which is formed in steps H and I of the first example or steps G and I of the second example.

Only by adding a step of forming a photosensitive film, an uneven-element forming step is changed to a step of forming a photosensitive film, a step of direct exposure of a photosensitive film, a step of etch-development, and a step of melting by use of heat treatment. With this, in contrast to the uneven-element forming process performed in the first, the second, and the third examples, the fourth example can eliminate a need of resist application, development, and removal steps, thus simplifying processes.

Although the fourth example has used a photosensitive acrylic resin as a photosensitive material, possible photosensitive materials are not limited to it. Other appropriate photosensitive materials, for example, a photosensitive organic resin, a photosensitive inorganic film, or a like can realize same effects. Note here that such photosensitive materials as products named "OFPR800" by Tokyo Applied Chemistry Industry Co., Ltd., "LC100" by Shipley Corporation, "Optomer Series" by Japan Synthetic Rubber Co., Ltd., "Photosensitive Polyimide" by Nissan Chemistry Industry Co., Ltd. or a like can be used to obtain almost a same uneven insulating, layer.

FIFTH EXAMPLE

Figure 15C:
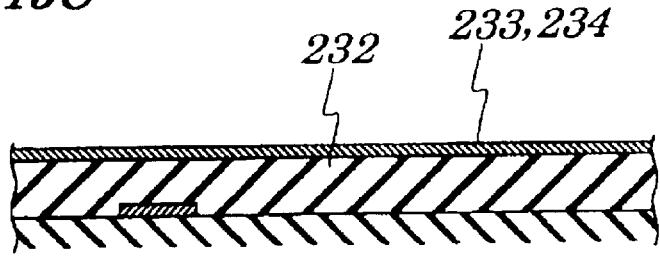
Figure 15D:
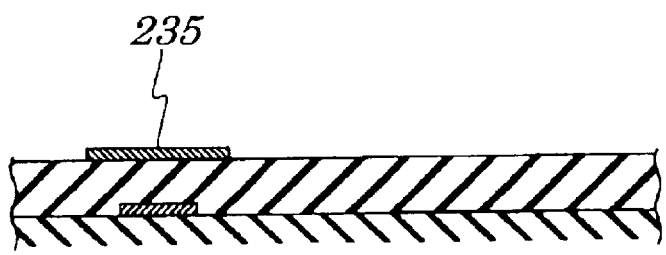
Figure 15E:
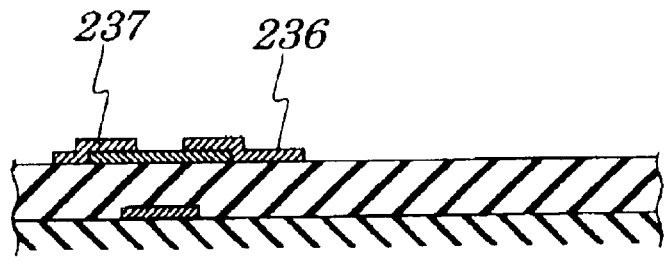
Figure 15G:
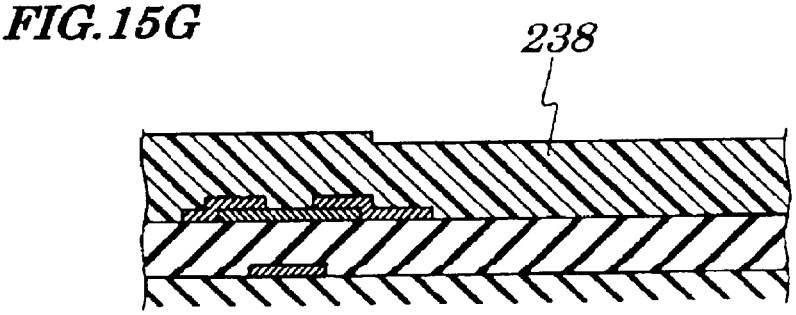

The fifth example employs a reverse stagger-structured TFT as a switching element. Basic manufacturing processes according to the fifth example are same as those shown in FIG. 15AB and FIG. 16L except that a photosensitive resin is used as a first insulating layer and a second insulating layer and that a resist process is omitted in forming a protrusion and a contact hole. A method for manufacturing a reflection-type liquid crystal display according to the fifth example includes steps of:

forming, as step A, a Cr layer (not shown) to a thickness of 50 nm on the glass substrate 230 by sputtering (FIG. 15AB);

forming, as step B, a gate electrode 231 (by means of a photographic process) (FIG. 15AB);

forming, as step C, a gate insulator film 232 to a thickness of 400 nm, a semiconductor layer 233 to a thickness of 100 nm, and a doping layer 234 to a thickness of 100 nm by plasma CVD respectively (FIG. 15C);

forming, as step D, an island 235 (by means of a photographic process) (FIG. 15D);

forming, as step E, Cr and ITO layers (not shown) by sputtering to a thickness of 50 nm respectively (FIG. 15EF);

forming, as step F, a source electrode 236, a drain electrode 237, and an uneven-element forming electrode (by means of a photographic process) (FIG. 15EF);

forming, as step G, a photosensitive acrylic resin layer to a thickness of 3 μm (FIG. 15G);

exposing, as step H, all uneven-element pattern onto the photosensitive acrylic resin (by means of a photographic process) (FIG. 16H);

forming, as step I, uneven elements by use of development-etching step (FIG. 16I);

exposing, as step J, a contact pattern onto the photosensitive acrylic resin (by means of a photographic process) (FIG. 16JK);

forming, as step K, a contact hole 241 by use of a development-etching step (FIG. 16JK);

forming, as step L, an aluminum layer to a thickness of 300 nm by sputtering (FIG. 16L);

forming, as step M, a reflection pixel electrode plate (by means of a photographic process); and terminating, as step N, a gate wiring line.

Afterward, opposing substrates are superposed one on another to manufacture the reflection-type liquid crystal display. A thus obtained reflection-type liquid crystal display can realize bright and high-definition multi-color display.

Figure 18:
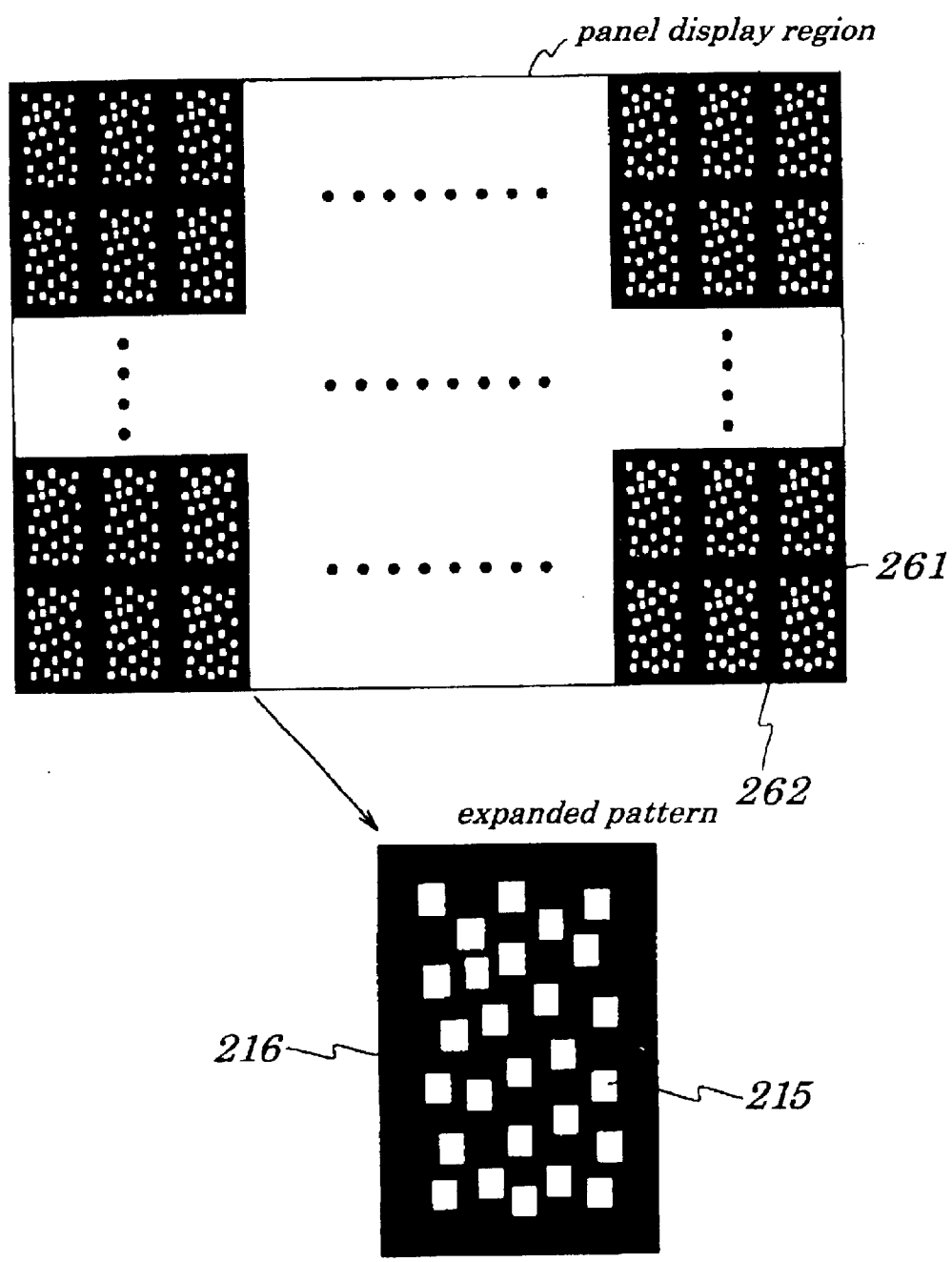
FIG. 18 is a plan view showing another protrusion pattern according to the fifth example.
Figure 19:
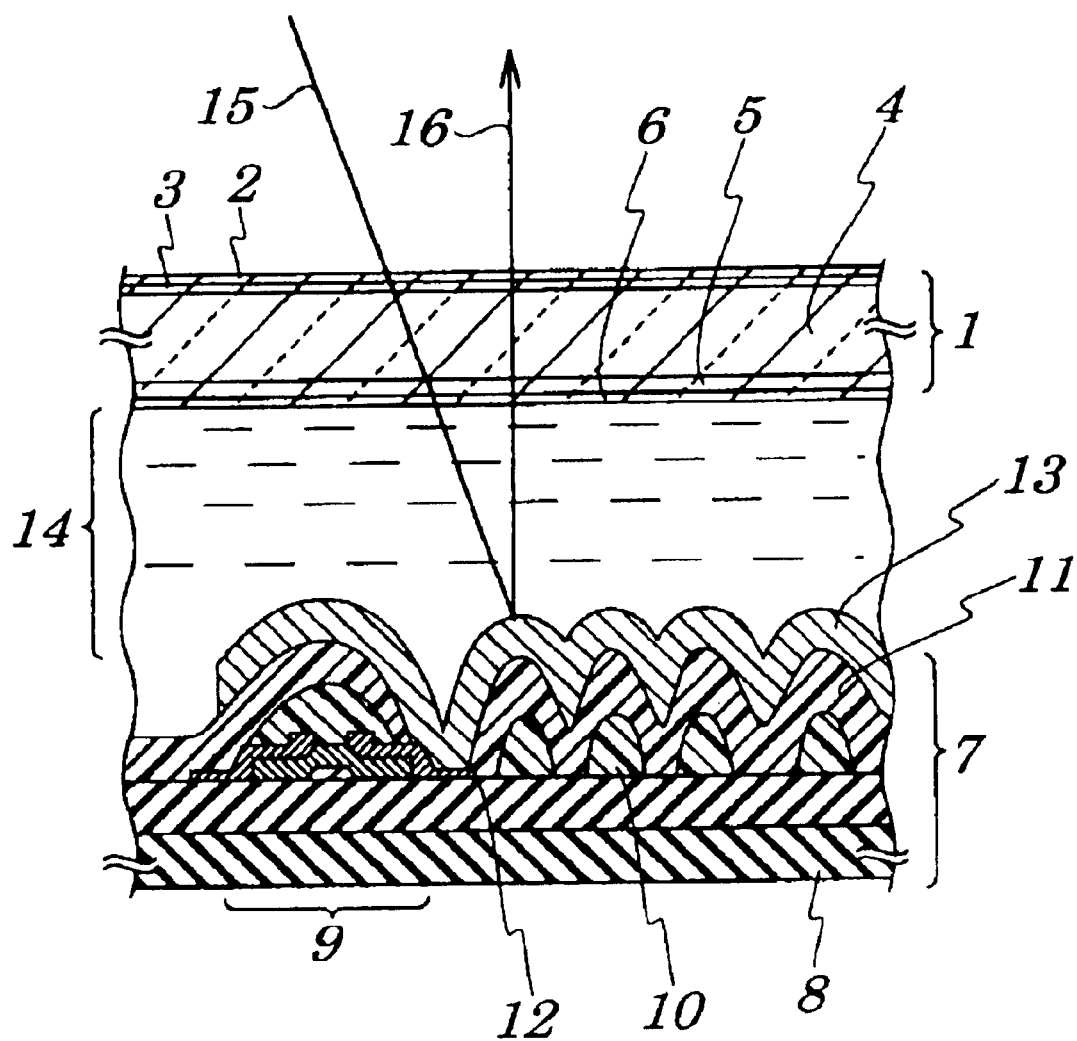
FIG. 19 is a cross-sectional view showing a conventional reflection-type liquid crystal display.
Figure 20A:
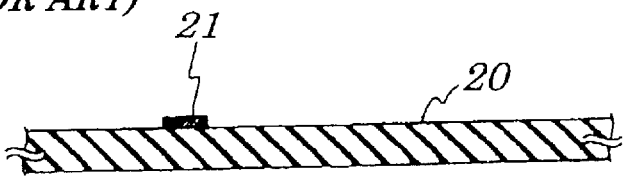
FIG. 20A through FIG. 20F are cross-sectional views showing a method for manufacturing a conventional reflection-type liquid crystal display, steps being performed in order of FIG. 20A through FIG. 20F.
Figure 20B:
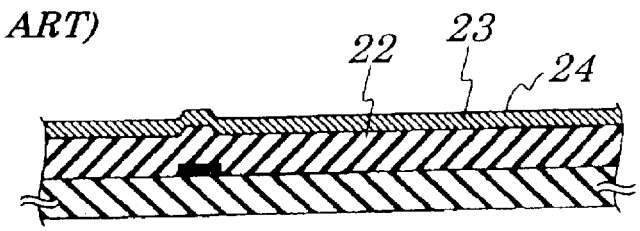
Figure 20C:
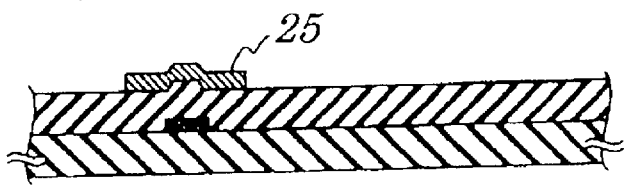
Figure 20D:
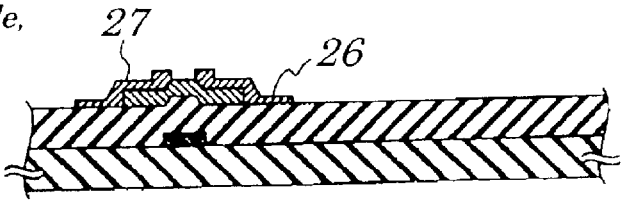
Figure 20E:
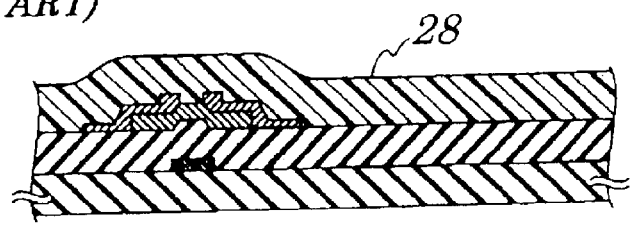
Figure 20F:
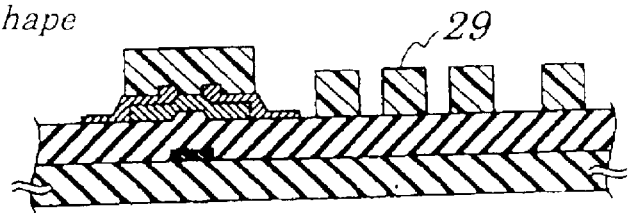
Figure 21G:
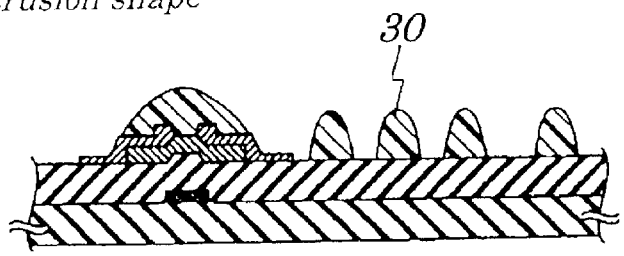
FIG. 21G through FIG. 21J are cross-sectional views showing continued steps of the method for manufacturing a conventional reflection-type liquid crystal display, the steps being performed in order of FIG. 21G through FIG. 21J.
Figure 21H:
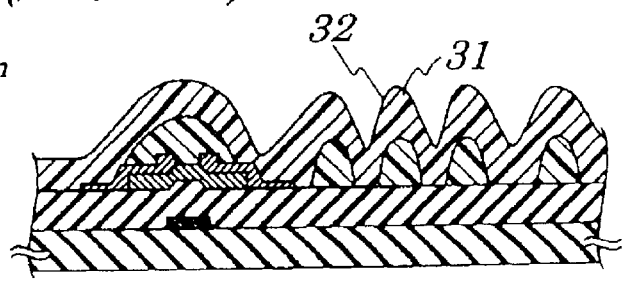
Figure 21I:
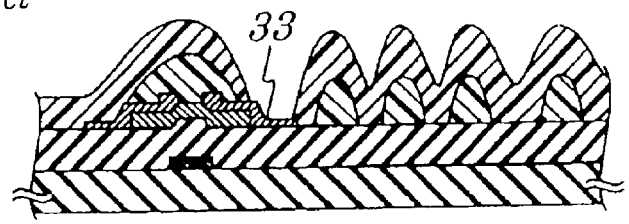
Figure 21J:
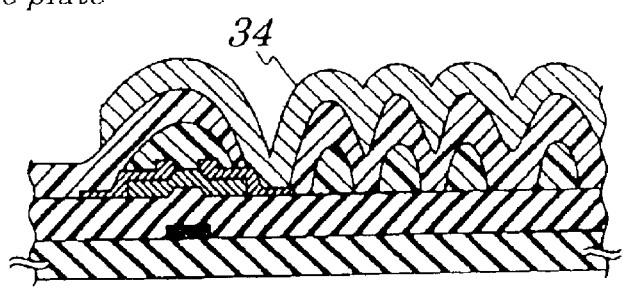
Figure 22:
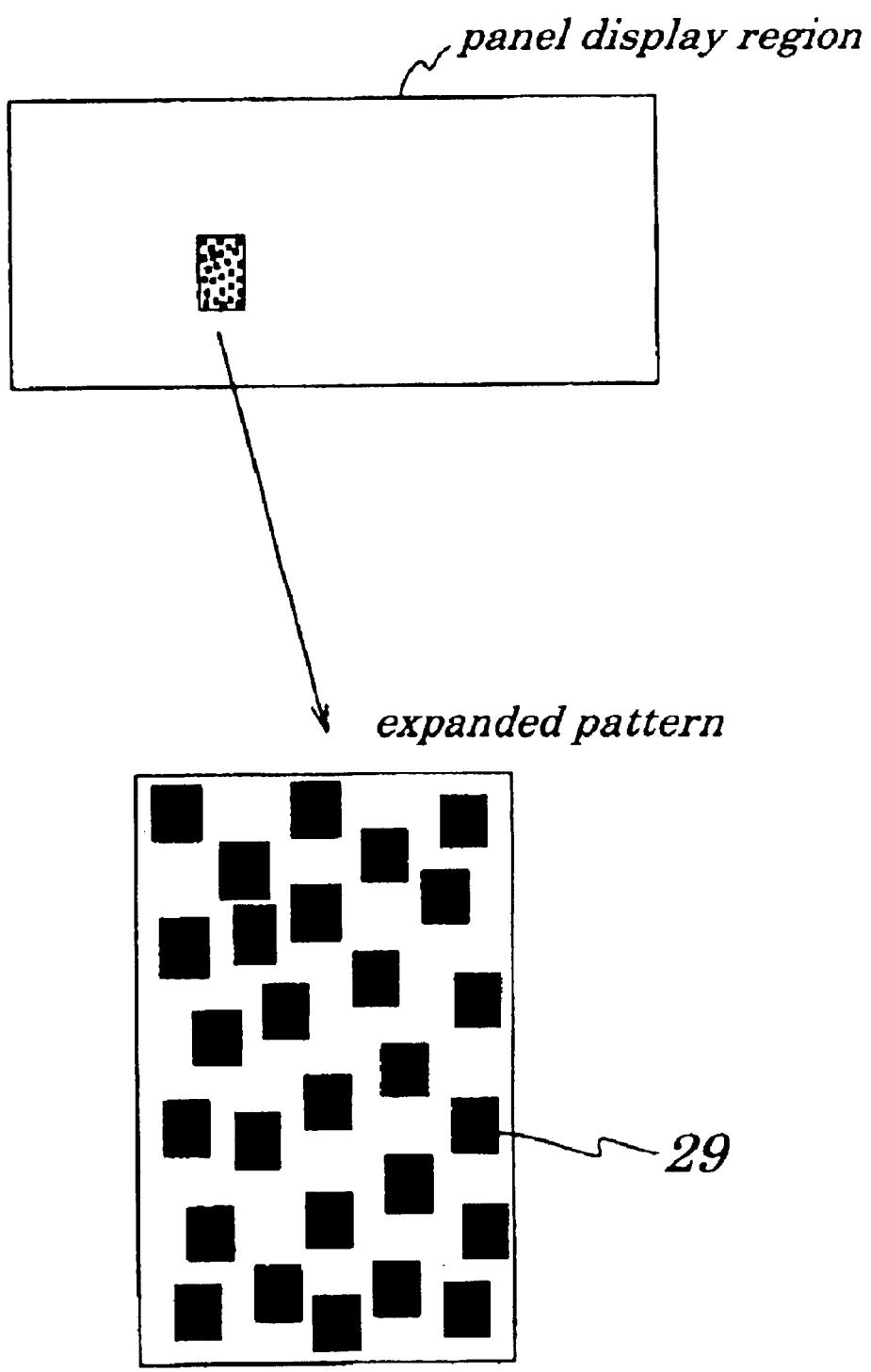
FIG. 22 is a plan view showing a protrusion pattern of a conventional reflection-type liquid crystal display.

FIG. 17 shows a pattern used to form the protrusion 239 in the step H. As shown in it, a continuous stripe-shaped pattern is used to pattern the first and second insulating layers so as to cover a gate wiring line and a drain wiring line. With this, parasitic capacitance is reduce which occurs between a reflecting electrode and a wiring line, to obtain good panel display performance. Also, when an isolated depression pattern shown in FIG. 18 is used, the reflection-type liquid crystal display having almost same display performance is obtained. Note here that in FIGS. 17 and 18, a continuous striped-shaped protrusion 215, an isolated depression 216, a stripe-shaped protrusion 260 on the wiring line, a stripe-shaped protrusion 261 on the gate wiring line, and a stripe-shaped protrusion 262 on the drain wiring line are shown.

In all the figures, same elements are indicated by same reference numerals, thus omitting duplicated description.

By the reflection-type liquid crystal display and method for manufacturing same according to the invention, all the protrusions 239 on the insulator film under the reflecting electrode are connected in a network, so that if some of all of these protrusions 239 have weaker adherence with the underlying layer, they can be supported by surrounding protrusions, thus preventing flake-off of the protrusions 239 as a whole.

In other words, since protrusions 239 formed on the first insulating layer are constituted by a plane pattern composed of isolated depressions or a continuous stripe, the protrusions 239 can have a large area in contact with the underlying layer, thus improving their adherence with the underlying film. This leads to realization of good protrusions free of film flake-off. Also, the reflection-type liquid crystal display employing the reflecting electrode formed on those protrusions can provide uniform and high-definition display having desired optical reflection properties.

It is apparent that the present invention is not limited to the above embodiments but may be changed and modified without departing from the scope and spirit of the invention.

What is claimed is:

1. A reflection-type liquid crystal display comprising:
   a transparent first substrate;
   a transparent electrode provided on said transparent first substrate;
   a second substrate;
   a reflecting electrode which is provided on an insulator film;
   an insulator film over said second substrate and being in such a shape as reflecting an uneven structure and having a first insulating layer and a second insulating layer over said first insulating layer; and
   a liquid crystal layer sandwiched by a side of said transparent electrode and a side of said reflecting electrode;
   wherein said first insulating layer has number of irregularly arranged depressions which are surrounded by interconnected protrusions.

2. A reflection-type liquid crystal display comprising:
   a transparent first substrate;
   a transparent electrode provided on said transparent first substrate;
   a second substrate;
   an insulator film, which is provided on said second substrate, includes a surface having an uneven structure;
   a reflecting electrode which is provided on said insulator film in such a shape as reflecting said uneven structure;
   and a liquid crystal layer sandwiched by a side of said transparent electrode and a side of said reflecting electrode; wherein said insulator film includes a first insulating layer in which a large number of depressions are irregularly arranged which are isolated and surrounded by protrusions and a second insulating layer over said first insulating layer entirely, and wherein said depressions are constructed by a part surrounded by a number of stripe-shaped protrusions arranged irregularly.

3. The reflection-type liquid crystal display according to claim 1, wherein said uneven structure is formed by a repetition of an irregular shape which is given in units of one picture element or more.

4. The reflection-type liquid crystal display according to claim 1, wherein said depressions and said protrusions have a smooth sectional shape.

5. The reflection-type liquid crystal display according to claim 1, wherein:
   a liquid crystal driving switching element is provided on said second substrate; and
   said insulator film serves also as a protection film for said switching element.

6. The reflection-type liquid crystal display according to claim 5, at least one of said first insulating layer and said second insulating layer covers at least one of a drain wiring line and a gate wiring line of said switching element.

7. The reflection-type liquid crystal display according to claim 1, wherein at least one of said first insulating layer and said second insulating layer has photo-absorbancy.

8. The reflection-type liquid crystal display according to claim 1, wherein:
   a liquid crystal driving switching element is provided on said second substrate; and a contact hole is formed in said insulator film electrically interconnecting said liquid crystal driving switching element and said reflecting electrode.

9. The reflection-type liquid crystal display according to claim 1, wherein said first insulating layer is made of an organic or inorganic resin having photosensitivity.

10. The reflection-type liquid crystal display according to claim 1, wherein said second insulating layer is made of an 3 organic or inorganic resin having photosensitivity.

11. A reflection-type liquid crystal display comprising:
    a transparent first substrate;
    a transparent electrode provided on said transparent first substrate;
    a second substrate;
    an insulator film, which is provided on said second substrate, includes a surface having an uneven structure;
    a reflecting electrode which is provided on said insulator film in such a shape as reflecting said uneven structure;
    and a liquid crystal layer sandwiched by a side of said transparent electrode and a side of said reflecting electrode; wherein said insulator film includes a first insulating layer in which a large number of depressions are irregularly arranged which are isolated and surrounded by protrusions and a second insulating layer over said first insulating layer, and, wherein at least one of said protrusions is stripe-shaped.

12. A reflection-type liquid crystal display comprising: a transparent first substrate;
   a transparent electrode provided on said transparent first substrate;
   a second substrate;
   an insulator film which is provided on said second substrate and also on a surface of which is formed an uneven structure; a reflecting electrode which is provided on said insulator film in such a shape as reflecting said uneven structure; and a liquid crystal layer in between and in contact with said transparent electrode formed on said first substrate and said reflecting electrode provided on said second substrate; wherein said insulator film includes a first insulating layer in which a large number of depressions are irregularly arranged which are isolated as surrounded by protrusions and a second insulating layer which covers said first insulating layer entirely.

* * * * *